US012654477B2

(12) United States Patent
Kano

(10) Patent No.: US 12,654,477 B2
(45) Date of Patent: Jun. 16, 2026

(54) PRINTING APPARATUS

(71) Applicant: SEIKO EPSON CORPORATION, Tokyo (JP)

(72) Inventor: Tomohisa Kano, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 158 days.

(21) Appl. No.: 18/795,273

(22) Filed: Aug. 6, 2024

(65) Prior Publication Data

US 2025/0050665 A1 Feb. 13, 2025

(30) Foreign Application Priority Data

Aug. 9, 2023 (JP) ................................ 2023-130308

(51) Int. Cl.
*B41J 29/02* (2006.01)
*B41J 29/13* (2006.01)

(52) U.S. Cl.
CPC ............... *B41J 29/02* (2013.01); *B41J 29/13* (2013.01)

(58) Field of Classification Search
CPC .................................. B41J 29/02; B41J 29/13
See application file for complete search history.

(56) References Cited

U.S. PATENT DOCUMENTS

2021/0023863 A1 * 1/2021 Kano ....................... B41J 29/13

FOREIGN PATENT DOCUMENTS

JP 2000168192 A * 6/2000
JP 2014-194983 A † 10/2014

* cited by examiner
† cited by third party

*Primary Examiner* — Sharon Polk
(74) *Attorney, Agent, or Firm* — WORKMAN NYDEGGER

(57) ABSTRACT

A board holding portion is provided with a standing portion disposed outside a operation board and including a flat surface intersecting a flat surface of the operation board, the standing portion is provided with a first insertion hole penetrating in a direction intersecting the flat surface included in the standing portion, the attachment portion includes a first arm portion extending outward a exterior portion, and disposed on an opposite side of the operation board with the standing portion interposed therebetween, the first arm portion is provided with a second insertion hole penetrating in a direction intersecting a longitudinal direction of the first arm portion, a screw member is inserted into the first insertion hole and the second insertion hole, and a fitting member disposed between the standing portion and the operation board, and fitting into the screw member is attached to the screw member.

9 Claims, 22 Drawing Sheets

PRINTING APPARATUS

The present application is based on, and claims priority from JP Application Serial Number 2023-130308 filed Aug. 9, 2023, the disclosure of which is hereby incorporated by reference herein in its entirety.

BACKGROUND

1. Technical Field

The present disclosure relates to a printing apparatus.

2. Related Art

JP 2014-194983 A discloses an input device in which an angle of a panel can be maintained even after a contact operation, and at the same time, that is easily assembled, and for which long-term reliability can be maintained.

In the input device, the operation panel is rotatably supported by a housing. A sliding projection having a sliding surface protrudes from a back surface of the operation panel and is inserted into a slit of the housing. A pressure contact member accommodated in an accommodation chamber inside the housing is biased downward by a coil spring and brought into pressure contact with an inclined wall. Since an interval between the inclined wall and the sliding surface becomes shorter on a lower side, the pressure contact member is brought into pressure contact with the sliding surface by sliding along the inclined wall.

However, in the existing configuration as disclosed in JP 2014-194983 A, there is a case where a space for disposing the sliding projection and the pressure contact member is required on a back surface or a periphery of an operation unit such as the operation panel. In addition, in order to maintain posture of the operation unit in a state of being pulled up by 90 degrees, it is necessary to position an upper side of the sliding projection at a position higher than an upper side of the operation unit, and there is a case where a space is also required for the upper side.

SUMMARY

A printing apparatus of the present disclosure includes a printing unit configured to discharge ink onto a printing medium to form an image, a transport unit configured to transport the printing medium, a frame to which the printing unit and the transport unit are attached, an exterior portion configured to cover the frame, an operation unit disposed outside the exterior portion, and an attachment portion to which the operation unit is rotatably attached, wherein the operation unit includes an operation board, and a board holding portion for holding the operation board, the board holding portion is provided with a standing portion disposed outside the operation board and including a flat surface intersecting a flat surface of the operation board, the standing portion is provided with a first insertion hole penetrating in a direction intersecting the flat surface included in the standing portion, the attachment portion includes a first arm portion extending outward the exterior portion, and disposed on an opposite side of the operation board with the standing portion interposed therebetween, the first arm portion is provided with a second insertion hole penetrating in a direction intersecting a longitudinal direction of the first arm portion, a screw member is inserted into the first insertion hole and the second insertion hole, and a fitting member disposed between the standing portion and the operation board, and fitting into the screw member is attached to the screw member.

DESCRIPTION OF EMBODIMENTS

Embodiments of the present disclosure will be described below with reference to the accompanying drawings. Note that in the description, directions such as front, rear, left, right, up, and down are the same as directions with respect to a printing apparatus 1 unless otherwise specified. In addition, in a state in which the printing apparatus 1 is installed when the printing apparatus 1 is used, a symbol FR illustrated in each drawing indicates a front side of the printing apparatus 1, a symbol UP indicates an upper side of the printing apparatus 1, and a symbol LH indicates a left side of the printing apparatus 1.

Figure 1:
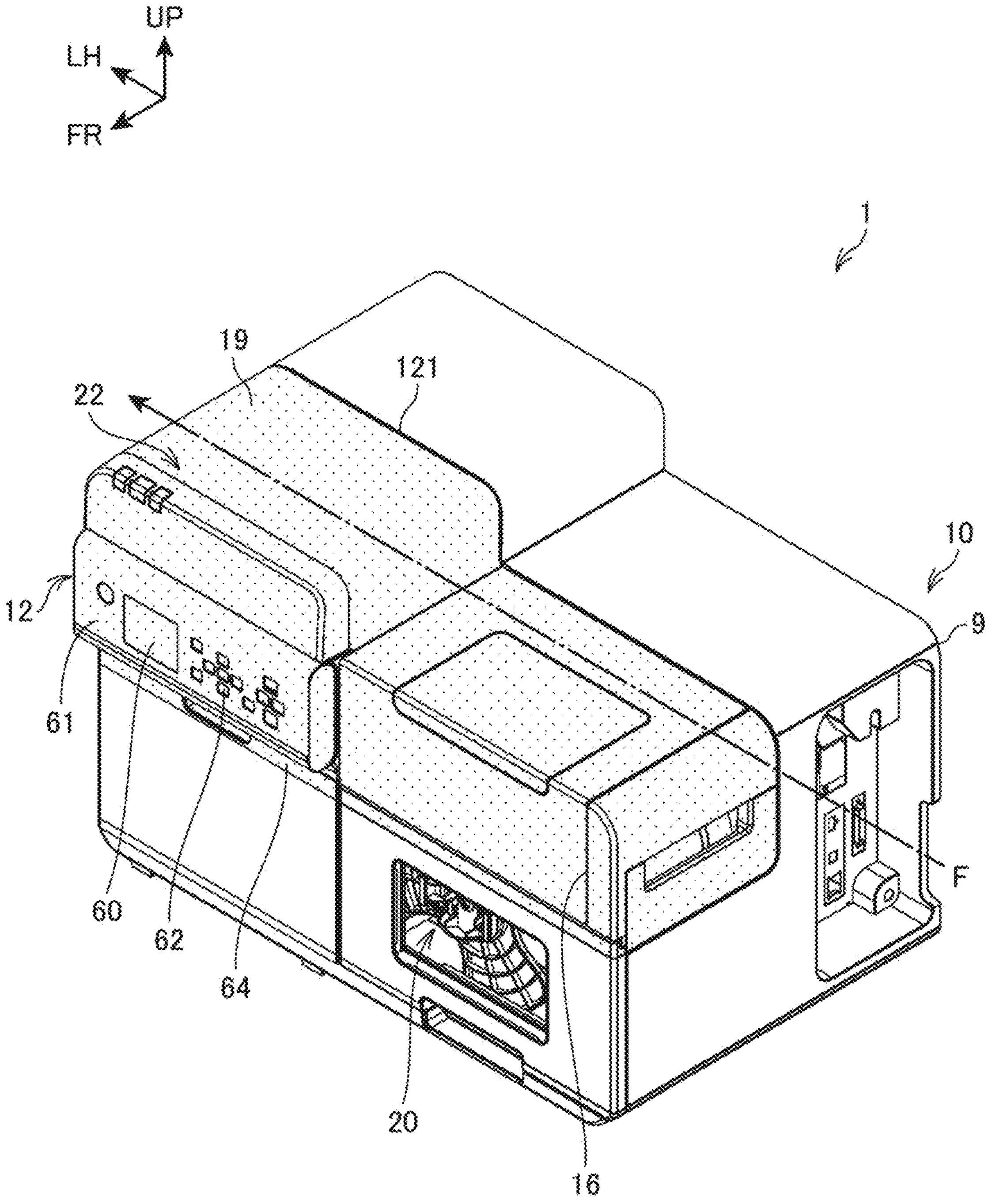
FIG. 1 is a perspective view of a printing apparatus.

FIG. 1 is a perspective view of the printing apparatus 1 as viewed from a right side. In FIG. 1, a portion of an exterior panel 9 that covers a transport path R is indicated with dots added.

The printing apparatus 1 is a so-called line-type ink jet-type printer that includes a line-shaped ink jet head, and discharges ink from the ink jet head to print characters or images on a printing medium.

The printing medium used for printing in the printing apparatus 1 is a cut sheet cut into a predetermined size or a continuous sheet. These sheets are formed of paper, a synthetic resin, or the like. These sheets may be, for example, of fine paper that is suitable for ink jet-type printing and that is subjected to surface processing to enhance ink absorbency and fixability.

Examples of the continuous sheet include a roll sheet accommodated in the printing apparatus 1 in a state of being wound in a roll shape, and a fanfold sheet supplied to the printing apparatus 1 from an outside of the printing apparatus 1 in a state of being folded. As the roll sheet, in addition to a sheet in which plain paper or fine paper is wound in a roll shape, a label sheet in which labels of a standard size having an adhesive on back surfaces are arranged on release paper serving as a mount and wound in a roll shape may be used.

In the present embodiment, a label sheet 100 is used as a print medium, the label sheet 100 being wound in a roll shape in which labels of a predetermined size having an adhesive on back surfaces thereof are disposed on a mount on which release paper that can be peeled off from the adhesive is formed in a long length. In the label sheet 100, a plurality of labels are disposed at equal intervals in a longitudinal direction of the mount. The printing apparatus 1 transports the label sheet 100 and prints characters or images on a printing surface of each label on the label sheet 100. That is, the printing apparatus 1 is a label printer.

Figure 8:
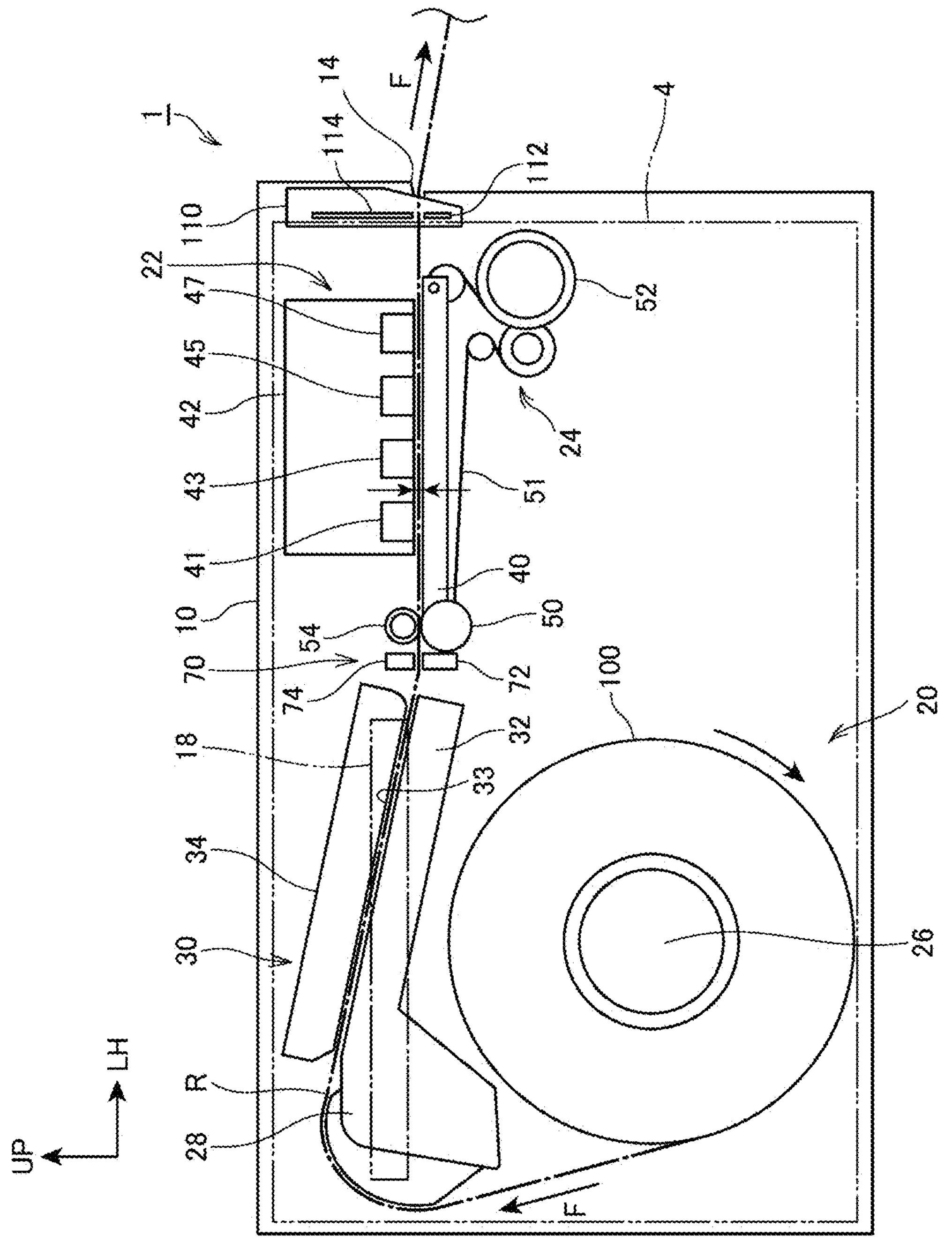
FIG. 8 is a rear view of a main part illustrating each part related to a transport path of the printing apparatus.

Note that the label sheet 100 is illustrated in FIG. 8 described later.

Figure 2:
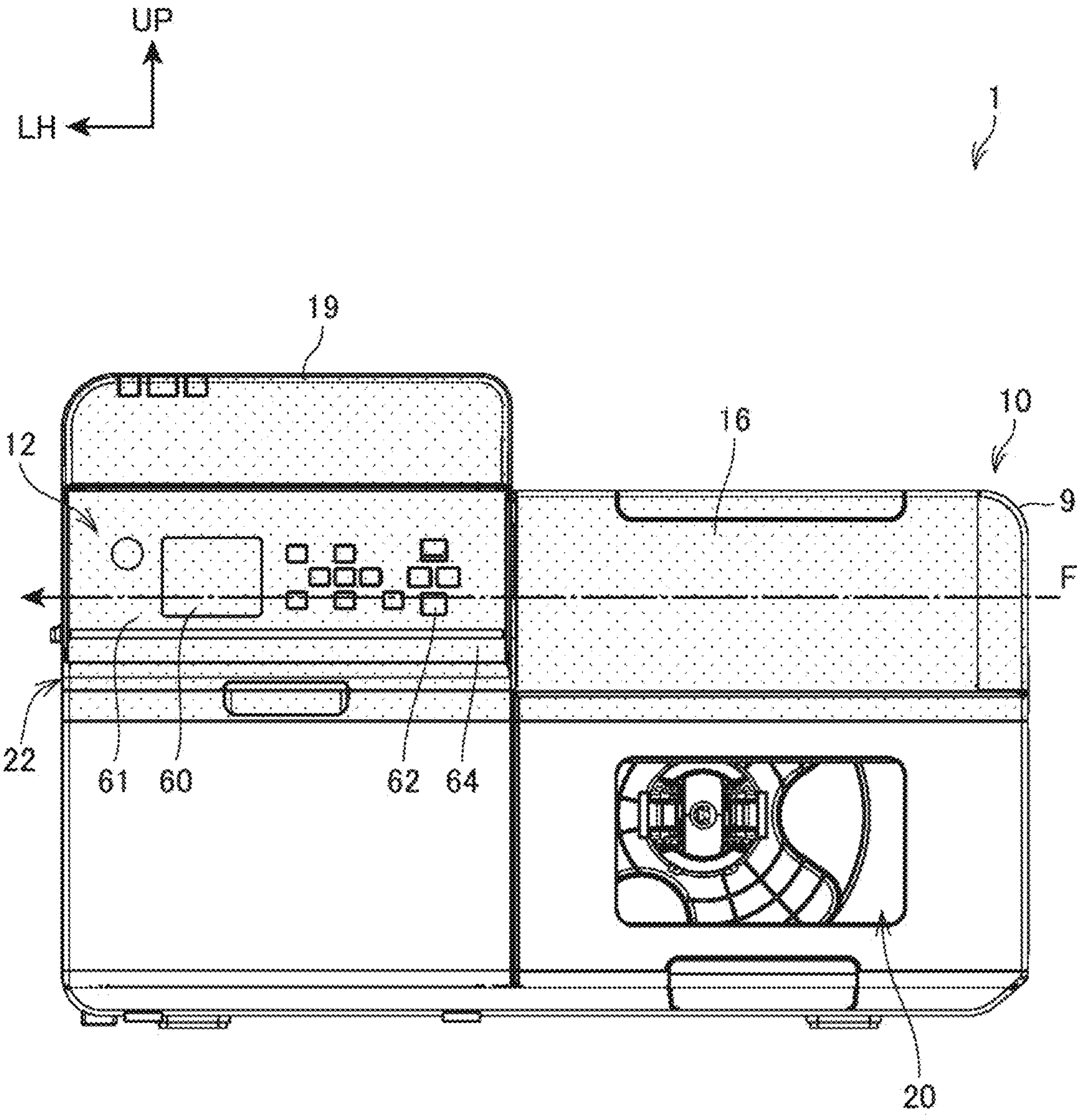
FIG. 2 is a front view of the printing apparatus.
Figure 3:
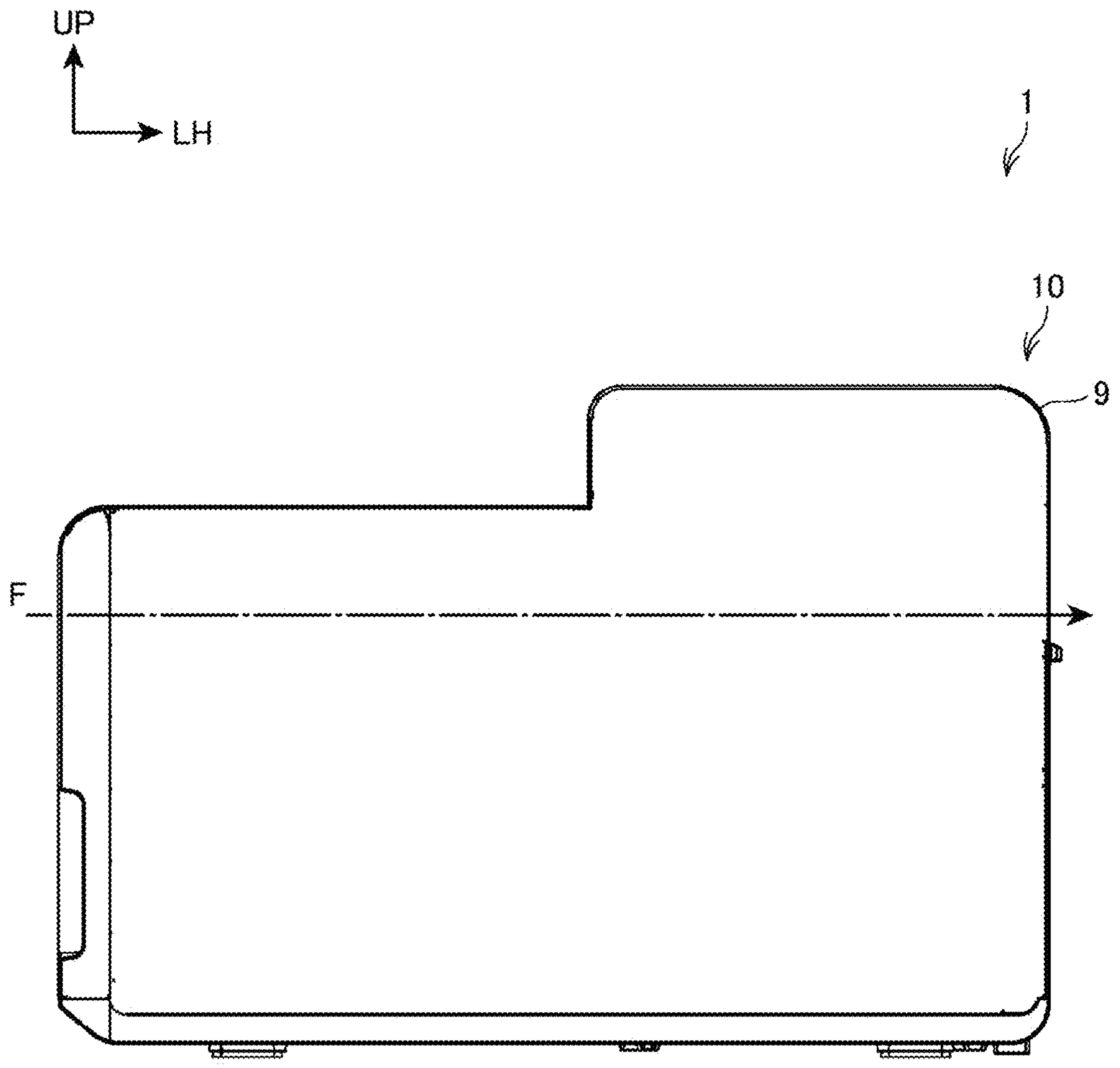
FIG. 3 is a rear view of the printing apparatus.
Figure 4:
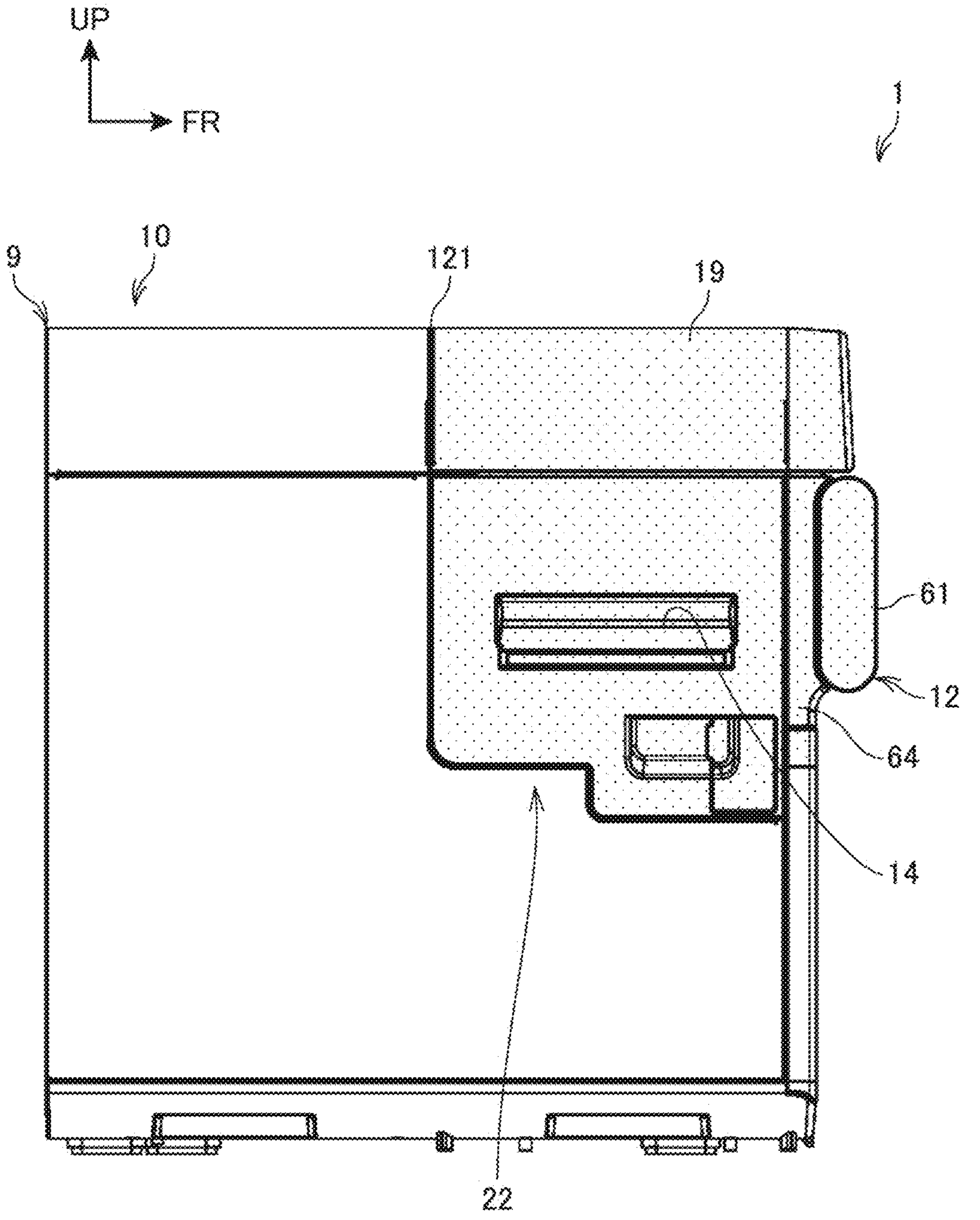
FIG. 4 is a left side view of the printing apparatus.
Figure 5:
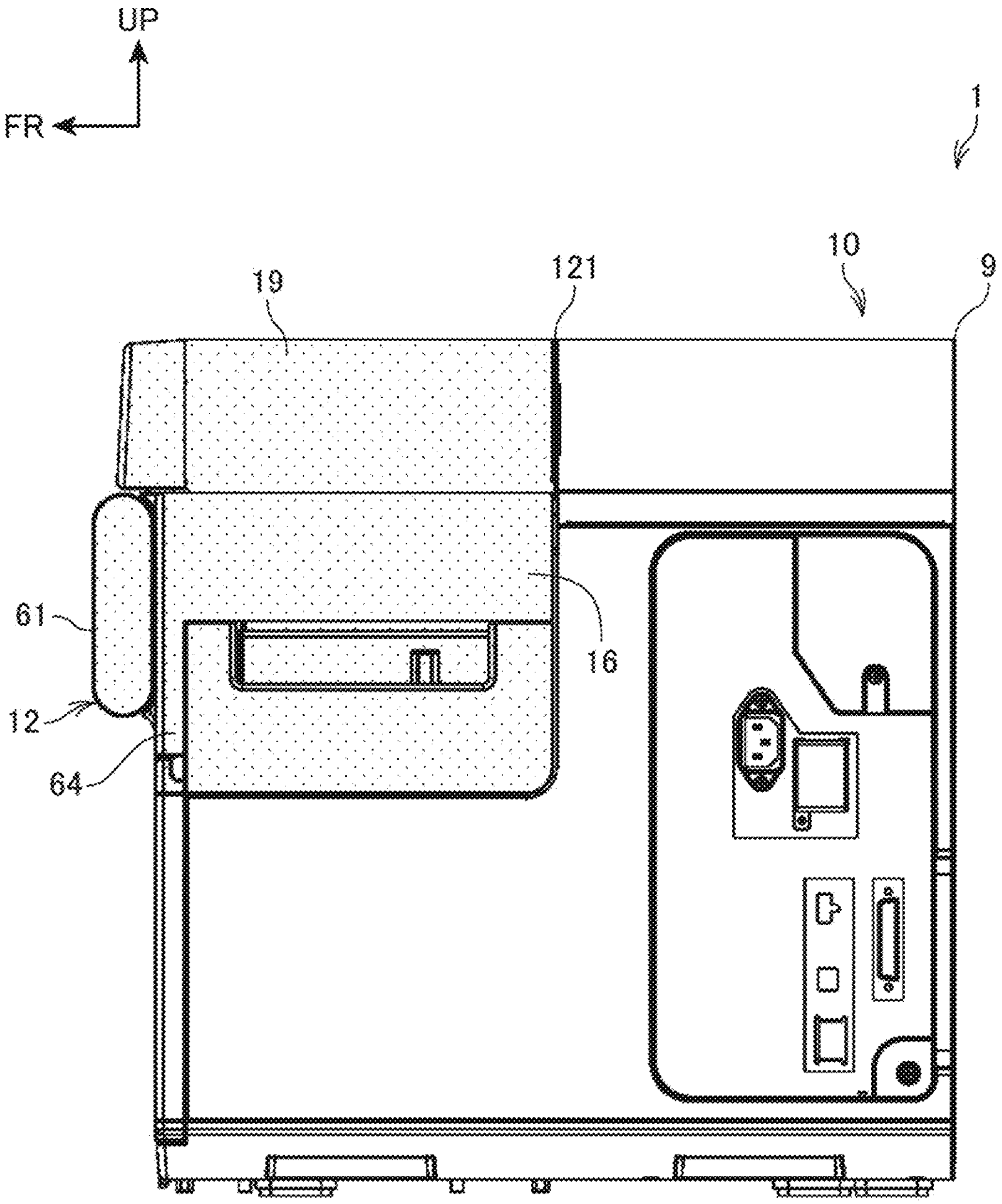
FIG. 5 is a right side view of the printing apparatus.
Figure 6:
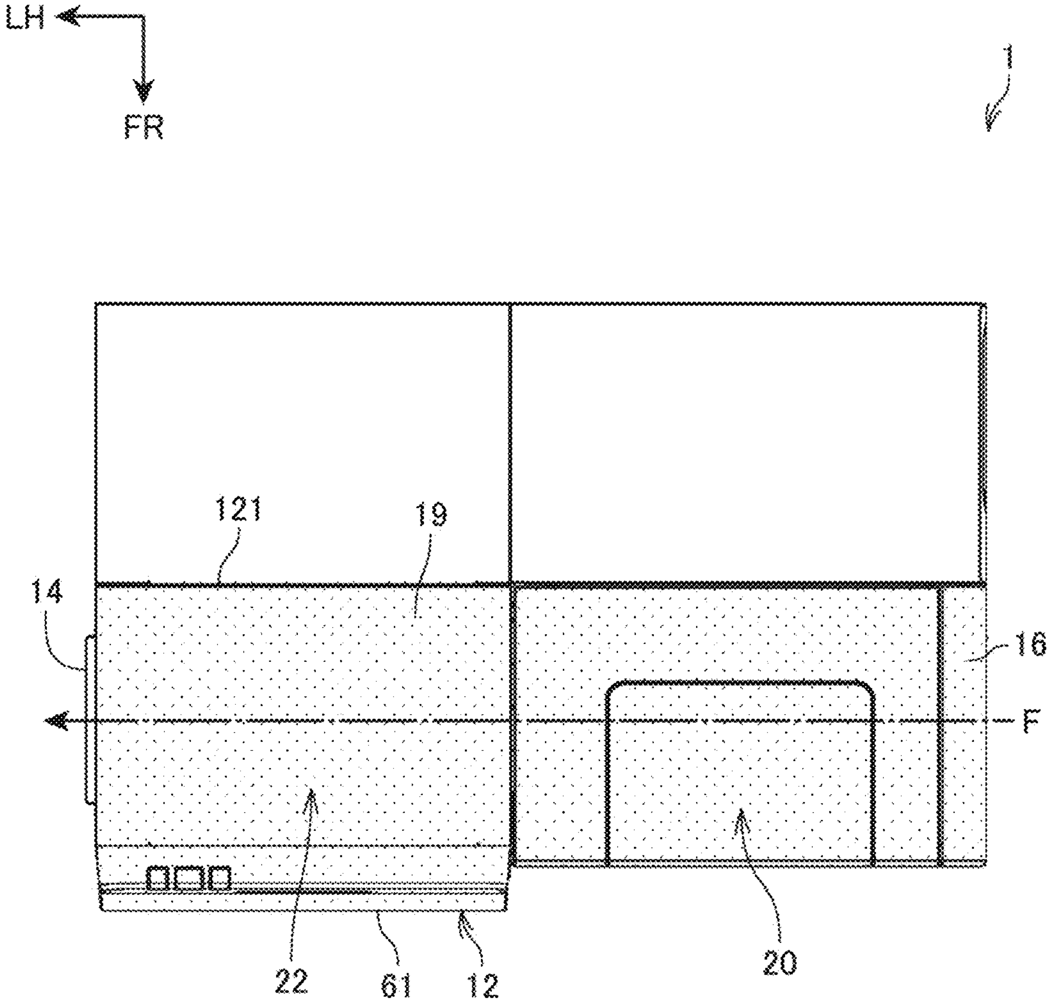
FIG. 6 is a plan view of the printing apparatus.
Figure 7:
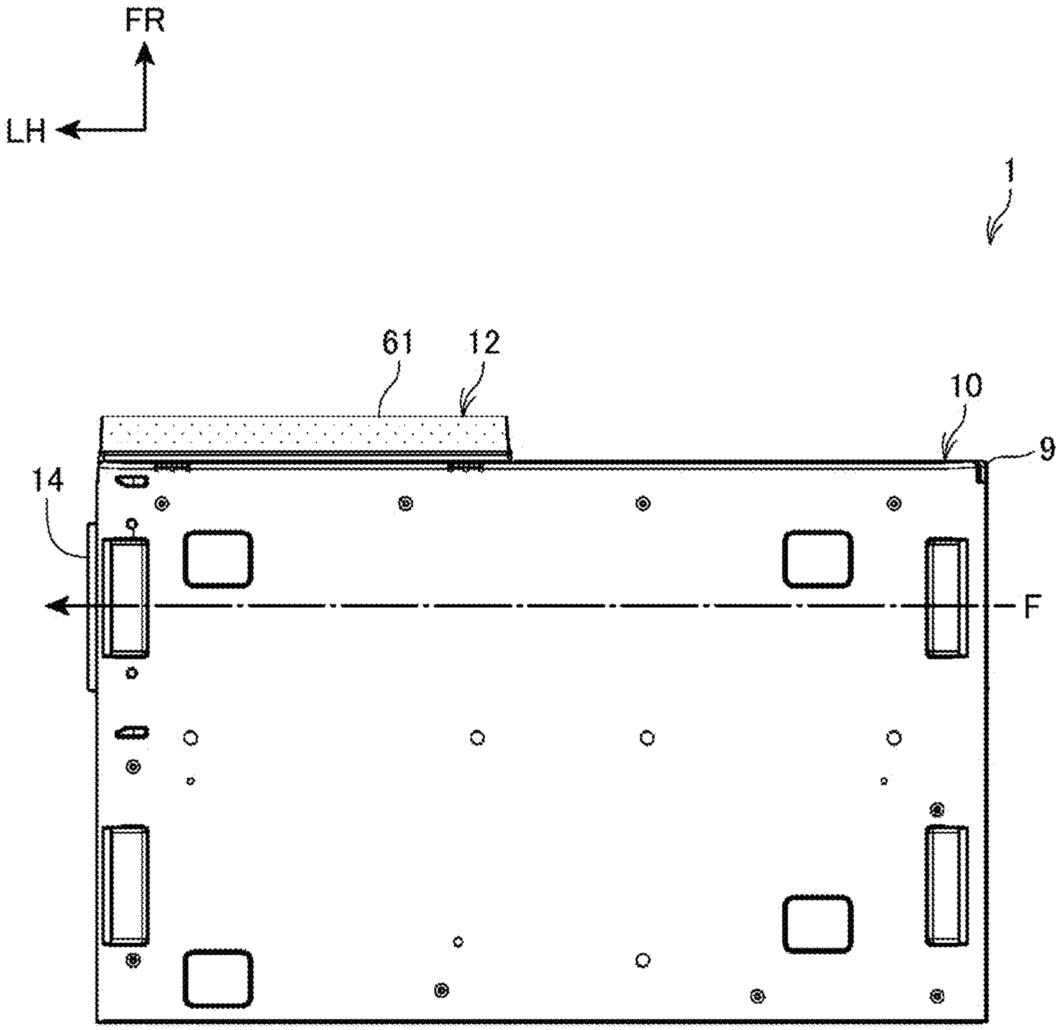
FIG. 7 is a bottom view of the printing apparatus.

FIG. 2 is a front view of the printing apparatus 1. FIG. 3 is a rear view of the printing apparatus 1. FIG. 4 is a left side view of the printing apparatus. FIG. 5 is a right side view of the printing apparatus. FIG. 6 is a plan view of the printing apparatus. FIG. 7 is a bottom view of the printing apparatus. In FIGS. 2 to 7, the portion of the exterior panel 9 that covers the transport path R is indicated with dots added.

As illustrated in FIGS. 1 to 7, the printing apparatus 1 includes an apparatus case 10 which is a substantially rectangular parallelepiped housing. The apparatus case 10 is formed by combining a plurality of the exterior panels 9 forming side surfaces, a front surface, a rear surface, and the like. The apparatus case 10 is an exterior portion forming an outer shell of the printing apparatus 1.

As illustrated in FIGS. 2 and 3, a top surface of the apparatus case 10 is provided with a step shape. In the top surface of the apparatus case 10, a top surface portion located on the left side is located to be higher than a top surface portion located on the right side.

As illustrated in FIGS. 1 and 2, a display/operation panel 12 is provided at a portion located in an upper half close to the left side of the front surface of the apparatus case 10. In the display/operation panel 12, a display 60 functioning as a display unit for displaying predetermined information, and an operator 62 such as an operation button are disposed at a flat surface portion 61. As illustrated in FIGS. 2 and 3, the display/operation panel 12 has a flat plate shape with a predetermined thickness dimension. The display/operation panel 12 is disposed such that a longitudinal direction thereof extends in left and right directions.

As illustrated in FIGS. 1, 2, and 4, the display/operation panel 12 is provided on a front surface side of an operation unit facing panel 64 which is a part of the exterior panel 9. As illustrated in FIG. 4, the operation unit facing panel 64 has a concave shape recessed from the front surface side of the apparatus case 10 toward the rear surface side of the apparatus case 10. The concave shape is formed along an outer shape of a rear surface of the display/operation panel 12. Therefore, when the rear surface of the display/operation panel 12 is disposed parallel to the operation unit facing panel 64, the display/operation panel 12 is disposed so as to fit into the operation unit facing panel 64.

Thus, in the printing apparatus 1, a portion of the display/operation panel 12 protruding from the apparatus case 10 is reduced. Therefore, in the printing apparatus 1, it is possible to provide the display/operation panel 12 while suppressing an increase in an installation space. Furthermore, when the printing apparatus 1 is packaged and transported, for example, it is possible to reduce a size of a box in which the printing apparatus 1 is housed. That is, when the printing apparatus 1 is packaged, it is possible to suppress an increase in packaging materials. For this reason, the printing apparatus 1 can be transported at low cost, and transport efficiency can be improved.

As illustrated in FIGS. 4 and 5, an upper end portion of the display/operation panel 12 has a curved shape that protrudes upward when the rear surface of the display/operation panel 12 is disposed parallel to the operation unit facing panel 64.

Accordingly, for example, even when liquid or the like adheres to the printing apparatus 1 from above, the liquid can be discharged along the curved surface at the upper end portion of the display/operation panel 12. For this reason, deposit is prevented from staying on the display/operation panel 12. In addition, in the printing apparatus 1, it is possible to prevent liquid from entering an electronic substrate, electronic components, and wiring lines inside the display/operation panel 12.

At the upper end portion of the display/operation panel 12, the curved surface shape is a semicircular shape concentric with a rotation axis of the display/operation panel 12. In addition, in the operation unit facing panel 64, a curved surface shape along the curved surface shape is formed at an upper end portion facing the curved surface shape. Therefore, an upper end of the display/operation panel 12 and an upper end of the operation unit facing panel 64 are disposed to be separated from each other with a predetermined gap therebetween.

Thus, in the printing apparatus 1, when the display/operation panel 12 is rotated about the rotation axis, the gap between the upper end of the display/operation panel 12 and the upper end of the operation unit facing panel 64 is kept constant in a rotatable range of the display/operation panel 12.

Therefore, when the display/operation panel 12 is rotated, foreign matter or the like is prevented from being sandwiched in the gap between the upper end of the display/operation panel 12 and the upper end of the operation unit facing panel 64.

The display/operation panel 12 corresponds to an "operation unit".

As illustrated in FIG. 1, the apparatus case 10 is provided with a sheet cover 16 so as to be openable and closeable. The sheet cover 16 forms a part of the front surface and a part of the top surface of the printing apparatus 1. The sheet cover 16 is formed from a position close to the right side of the front surface of the apparatus case 10 to a position close to the front side of the top surface of the apparatus case.

In the present embodiment, the sheet cover 16 forms a part of the top surface of the printing apparatus 1.

The sheet cover 16 is formed at the top surface of the apparatus case 10 so as to rotate about a coupling portion 120 provided substantially at a center in front and rear directions and to be openable and closable.

Inside the sheet cover 16, an accommodation portion 20 for accommodating the label sheet 100 is provided. In the printing apparatus 1, by opening the sheet cover 16, the label sheet 100 wound in a roll shape can be loaded into the accommodation portion 20. In the printing apparatus 1, by opening the sheet cover 16, it is possible to access an inside from an outside of the apparatus case 10, and it is possible to operate the accommodation portion 20 and each unit related to transport.

In the apparatus case 10, a printing unit cover 19 is provided on the left side of the sheet cover 16. The printing unit cover 19 forms a portion close to the front surface of the apparatus case 10 in a top surface portion. The printing unit cover 19 is formed so as to rotate about a coupling portion 121 provided substantially at a center of the top surface of the apparatus case 10 and to be openable and closable.

A printing unit 22 that performs printing on the label sheet 100 is provided below the printing unit cover 19. That is, the printing unit cover 19 covers the printing unit 22 from above.

As illustrated in FIG. 4, on a left side surface located on the left side of the apparatus case 10, a slit-like sheet discharge port 14 extending in the front and rear directions is formed at a substantially center close to the front surface when viewed from the left side surface. In the printing apparatus 1, the printed label sheet 100 is discharged from the sheet discharge port 14.

In the present embodiment, an operation unit, a display unit, and the like are not provided at the side surface at which the sheet discharge port 14 is formed.

FIG. 8 is a rear view of a main part illustrating each part related to the transport path R of the printing apparatus 1.

As illustrated in FIG. 8, the printing apparatus 1 includes the accommodation portion 20 that accommodates the label sheet 100, the printing unit 22 that performs printing on the label sheet 100, and a transport unit 24 that transports the label sheet 100 from the accommodation portion 20 to the printing unit 22.

As illustrated in FIGS. 1 to 8, in the printing apparatus 1, the accommodation portion 20 is provided on the right side, and the printing unit 22 is provided on the left side of the accommodation portion 20. The transport unit 24 is provided below the printing unit 22.

The accommodation portion 20 includes a roll shaft 26 to which the label sheet 100 is attached. The roll shaft 26 is a rod-shaped member provided so as to be rotatable in a circumferential direction. The label sheet 100 is accommodated in the accommodation portion 20 by inserting the roll shaft 26 into a center of a roll of the label sheet 100. For example, a driving device such as a motor may be coupled to the roll shaft 26, and the roll shaft 26 may rotate in accordance with driving of the driving device. In the printing apparatus 1, the label sheet 100 rotates as the roll shaft 26 rotates.

In the printing apparatus 1, the transport path R is formed in which one end of the label sheet 100 attached to the roll shaft 26 is pulled out and transported to the sheet discharge port 14.

In the transport path R, a tension lever 28 is attached above the label sheet 100 accommodated in the accommodation portion 20. The tension lever 28 has a curved surface in a circumferential direction and is formed in a columnar shape extending in the front and rear directions. The tension lever 28 applies tension to the label sheet 100 to prevent the label sheet 100 from slackening. The one end of the label sheet 100 is pulled out upward, comes into contact with the tension lever 28, is bent by the tension lever 28, and then is extended leftward.

A sheet guide unit 30 is provided on the left side of the tension lever 28. The sheet guide unit 30 guides the label sheet 100 leftward, and suppresses skewing of the label sheet 100 and deviation in transport of the label sheet 100.

The sheet guide unit 30 includes a lower guide member 32 that supports the label sheet 100 from below, and a pair of sheet pressing members 34 located on an upper surface side of the label sheet 100.

The lower guide member 32 includes a flat surface 33 extending in the left and right directions. The flat surface 33 has a width dimension longer than a width dimension of the label sheet 100 along the front and rear directions of the apparatus case 10. The label sheet 100 is placed on and supported by the flat surface 33 of the lower guide member 32.

The sheet pressing member 34 is located above the label sheet 100 so as to face the lower guide member 32, and holds the label sheet 100 from floating. The sheet pressing members 34 are disposed at respective portions located at both ends of the lower guide member 32 along a direction intersecting a transport direction F. Each of the sheet pressing members 34 is provided so as to be rotatable with a rotation axis parallel to the transport direction F as a rotational center. The sheet pressing member 34 is rotatable from a position facing the flat surface 33 with a predetermined gap therebetween to a position separated from the flat surface 33.

The label sheet 100 is disposed on the flat surface 33 in a state where each of the sheet pressing members 34 is disposed at a position separated from the flat surface 33. Thereafter, the sheet pressing member 34 is rotated to a position facing the flat surface 33 with a predetermined gap therebetween, so that the label sheet is sandwiched between the lower guide member 32 and the sheet pressing member 34.

In the sheet guide unit 30, the label sheet 100 is transported in a state of being sandwiched between the lower guide member 32 and the sheet pressing member 34. The sheet guide unit 30 functions as a guide portion for the label sheet 100.

The printing unit 22 that performs printing on the label sheet 100 is provided on the left side of the sheet guide unit 30. The printing unit 22 includes a platen 40 and a printing head 42. The printing head 42 of the present embodiment forms dots on a printing surface of a label by spraying ink of four colors of C (cyan), M (magenta), Y (yellow), and K (black). The printing head 42 includes a nozzle unit 41 that sprays a K (black) ink, a nozzle unit 43 that sprays a C (cyan) ink, a nozzle unit 45 that sprays an M (magenta) ink, and a nozzle unit 47 that sprays a Y (yellow) ink. In the nozzle units 41 to 47, a plurality of nozzles for spraying ink are arranged in a row in a width direction of the label sheet 100. The nozzles included in each of the nozzle units 41 to 47 are arranged along a direction intersecting the transport direction F. In the present embodiment, the direction in which the nozzles are arranged is a direction orthogonal to the transport direction F. The direction in which the nozzles are arranged coincides with the width direction of the label sheet 100. The printing head 42 functions as an image forming unit.

The printing head 42 is a line ink jet head capable of spraying ink without performing scanning in the width direction of the label sheet 100. Therefore, the nozzle rows of the nozzle units 41 to 47 are formed in a width at least equal to a printable range of the label sheet 100 or wider. In the present embodiment, the printable range corresponds to the printing surface of the label.

In the present embodiment, a configuration example will be described in which the nozzle units 41, 43, 45, and 47 are disposed in this order along the transport direction F of the label sheet 100, but the disposition order of the nozzles of the respective colors in the transport direction F is freely selected.

The platen 40 includes a flat surface disposed parallel to the transport direction F. This flat surface is located below the transport path R and faces the printing head 42. The nozzle units 41 to 47 and the platen 40 are disposed with a gap which is a so-called platen gap therebetween.

The platen 40 includes a flat upper surface that supports the label sheet 100 from below. The platen 40 is provided over at least an entire printing range in the printing unit 22. An upper surface of the platen 40 is disposed substantially horizontally in an installation state and a use state of the printing apparatus 1.

The transport unit 24 includes a columnar transport roller 50. The transport roller 50 is disposed such that a longitudinal direction thereof extends along a direction intersecting the transport direction F, and is provided so as to be rotatable in a circumferential direction. The transport roller 50 is disposed between a left end of the sheet guide unit 30 and a right end of the platen 40 in the transport direction F.

A driven wheel is provided at one end portion of the transport roller 50. A transmission belt 51 is wound around the driven wheel. The transmission belt 51 is wound around a driving shaft included in a transport motor 52. Accordingly, the transport roller 50 and the transport motor 52 are coupled to each other via the transmission belt 51.

The transport motor 52 is a driving device that rotationally drives the transport roller 50. The transport motor 52 and the transmission belt 51 are provided below the platen 40.

The transport unit 24 includes a plurality of driven rollers 54. The driven roller 54 has a columnar shape, and a circumferential surface thereof is formed of a flexible material such as a rubber material. The plurality of driven rollers 54 are rotatably disposed along a longitudinal direction of the transport roller 50. Any of the driven rollers 54 is biased so that the circumferential surface thereof comes into contact with a circumferential surface of the transport roller 50. Accordingly, the transport roller 50 and the driven roller 54 are disposed in contact with each other in a state in which the circumferential surfaces thereof face each other.

The transport roller 50 is disposed on the lower guide member 32 side, and the driven roller 54 is disposed on the sheet pressing member 34 side.

Note that the transport roller 50 may be disposed on the lower guide member 32 side, in other words, on the platen 40 side. Further, for example, the transport unit 24 may include a transporting belt movable above the upper surface of the platen 40 instead of the transport roller 50.

In the transport unit 24, when the transport motor 52 is driven, the transport roller 50 is rotationally driven via the transmission belt 51, and the driven roller 54 follows to be rotationally driven. Accordingly, the label sheet 100 loaded between the lower guide member 32 and the sheet pressing member 34 is sandwiched between the transport roller 50 and the driven roller 54, and is transported to the printing unit 22 as the transport roller 50 is rotationally driven.

The label sheet 100 that is placed on the flat surface 33 and sent out from the sheet guide unit 30 is inserted and sandwiched between the transport roller 50 and the driven roller 54. When the transport roller 50 rotates in this state, the label sheet 100 is transported to the printing unit 22.

In the printing apparatus 1, the transport roller 50 and the driven roller 54 form a transport roller pair.

In the printing apparatus 1, a label detector 70 is provided on the transport path R. The label detector 70 detects a leading end and a trailing end of the label sheet 100, and a leading end and a trailing end of the label.

The label detector 70 of the present embodiment is disposed downstream of the sheet guide unit 30 and upstream of the transport roller 50. The label detector 70 is, for example, an optical transmission-type sensor including a light-emitting unit 72 on a lower surface side of the label sheet 100 and a light-receiving unit 74 on the upper surface side of the label sheet 100 in the transport path R. The light-emitting unit 72 and the light-receiving unit 74 are disposed to face each other along a vertical direction with an interval therebetween that allows the label sheet 100 to pass therethrough. That is, the light-emitting unit 72 and the light-receiving unit 74 are disposed to face each other along a thickness direction of the label sheet 100. As a result, the light-emitting unit 72 and the light-receiving unit 74 are disposed at substantially the same positions in the left and right directions.

Note that the label detector 70 may be disposed downstream of the transport roller 50 and upstream of the printing head 42.

In addition, for example, the light-emitting unit 72 may be disposed on the lower guide member 32 side, and the light-receiving unit 74 may be disposed on the sheet pressing member 34 side. In this case, the light-emitting unit 72 may be disposed on the platen 40 side, and the light-receiving unit 74 may be disposed on the printing head 42 side.

In the label detector 70, the light-emitting unit 72 and the light-receiving unit 74 can be disposed at positions such that the light-receiving unit 74 can receive light emitted from the light-emitting unit 72 at predetermined signal intensity. In this case, an output value indicating an amount of light received by the light-receiving unit 74 is different for each of a case where there is no label sheet 100 directly below the light-receiving unit 74, a case where there is the mount, and a case where there is the label. That is, light emitted from the light-emitting unit 72, light transmitted through the mount, and light transmitted through the label are different from each other in the signal intensity. Therefore, the label detector 70 can detect the leading end and the trailing end of the label sheet 100, and the leading end and the trailing end of the label, based on the output values indicating the amounts of light received by the light-receiving unit 74.

A cutter unit 110 is disposed downstream in the transport direction F of the printing head 42, in other words, on the left side of the printing head 42. The cutter unit 110 includes a fixed blade 112 and a movable blade 114 disposed with the transport path R interposed therebetween, and the movable blade 114 is coupled to a driving device such as a motor for driving a cutter via a gear or the like. In the cutter unit 110, when the motor is driven, the movable blade 114 moves to the fixed blade 112 side and cuts the label sheet 100. The cutter unit 110 may cut the label sheet 100 so as to leave a part of the label sheet 100 in the width direction, or may completely cut the label sheet 100. In the printing apparatus 1, the cutter unit 110 cuts the label sheet 100 printed by the printing head 42 to a predetermined length, and discharges the cut label sheet 100 from the sheet discharge port 14.

Note that the cutter unit 110 may be formed separately from the printing apparatus 1, and may be detachably provided at, for example, a left side surface of the printing apparatus 1.

The printing apparatus 1 includes a control board 18 that controls each unit of the printing apparatus 1. The control board 18 includes a CPU, a ROM, a RAM, and the like, as a calculation execution unit. The ROM of the control board 18 stores firmware executable by the CPU, data related to the firmware, and the like in a non-volatile manner. In addition, the RAM temporarily stores the data related to the firmware executed by the CPU. The control board 18 may include other peripheral circuits and the like. The control board 18 may include a storage unit capable of storing various programs and data such as control programs and data related to these control program in a non-volatile manner.

The control board 18 is formed so as to be capable of detecting an operation on the printing apparatus 1 and a transport amount of the label sheet 100.

The control board 18 is formed so as to be capable of controlling the driving device included in the printing apparatus 1 such as the transport motor 52.

In the printing head 42, the control board 18 supplies voltage to a pump that supplies ink from an ink tank and piezoelectric elements provided at the nozzle units 41 to 47 of the printing head 42 to operate the components. Thus, in the printing apparatus 1, ink droplets are discharged from each nozzle of the nozzle units 41 to 47 to form dots.

As illustrated in FIG. 8, a frame 4 is housed inside the apparatus case 10. The frame 4 is a framework member to which various mechanical units included in the printing apparatus 1, such as the accommodation portion 20, the printing unit 22, the transport unit 24, and the control board 18, are attached and that supports the mechanical units. The printing apparatus 1 is formed by covering the frame 4 to which the various mechanism units are attached with each of the exterior panels 9.

In the present embodiment, the frame 4 is formed of a metal member. As a result, electrical conduction of the frame 4 can be ensured. Therefore, in the printing apparatus 1, resistance to noise caused by static electricity or the like can be improved. Furthermore, in the printing apparatus 1, influence of electromagnetic waves from the outside of the printing apparatus 1 can be reduced, and emission of radiated electromagnetic waves from the printing apparatus 1 can be suppressed.

Note that the frame 4 may be formed of, not limited to the metal member, another member such as a resin material.

As illustrated in FIGS. 1 to 8, in the exterior panel 9, a periphery of the sheet discharge port 14, the printing unit cover 19, an upper portion of the sheet cover 16, the display/operation panel 12, and the operation unit facing panel 64 located on the rear surface side of the display/operation panel 12 are colored differently from other portions. In this way, the portions colored differently from the other portions correspond to the portion covering the transport path R. As a result, in the printing apparatus 1, contrast occurs between the portions covering the transport path R and the other portions of the exterior panel 9. Therefore, in the printing apparatus 1, it is easy for a user to grasp a position of the transport path R from an external appearance.

In the printing apparatus 1 of the present embodiment, the portions covering the transport path R are colored in a black-based color, and the other portions are colored in a white-based color.

Note that in the printing apparatus 1, it is sufficient that a there is a color difference equal to or greater than a certain level between the portions covering the transport path R and the other portions. For example, the portions covering the transport path R may be in a white-based color and the other portions may be in a black-based color. In addition, for example, in the printing apparatus 1, one of the portion covering the transport path R and the other portion may be in a chromatic color, and another may be in an achromatic color.

Figure 9:
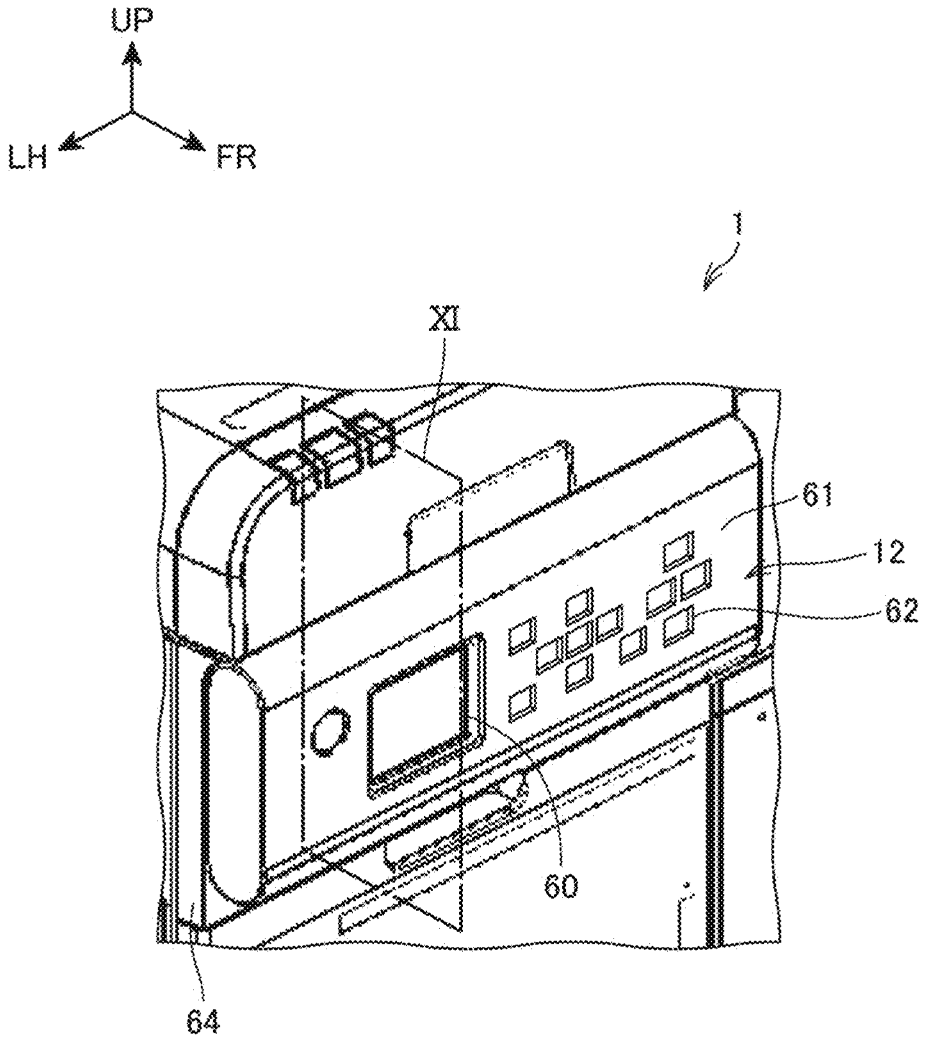
FIG. 9 is a perspective view of a display/operation panel.
Figure 10:
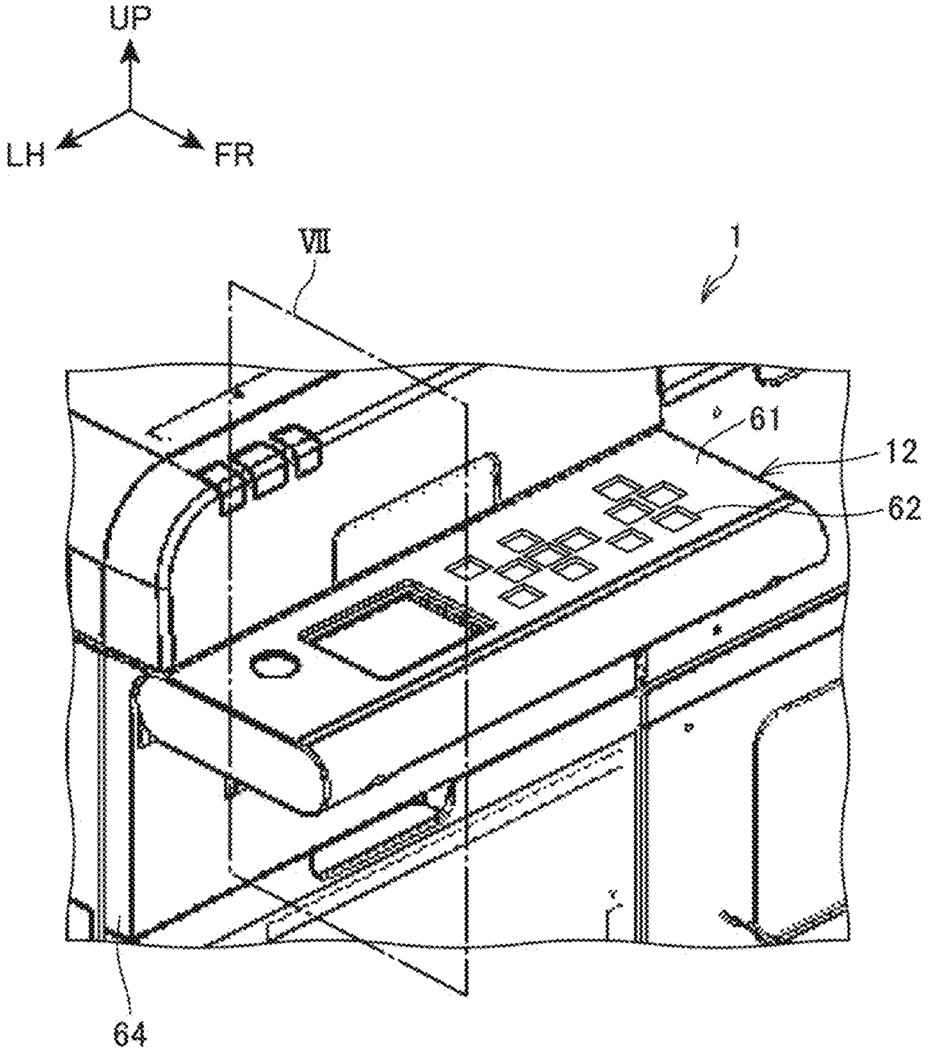
FIG. 10 is a perspective view of the display/operation panel.

FIGS. 9 and 10 are perspective views of the display/operation panel 12.

As illustrated in FIGS. 9 and 10, the display/operation panel 12 is provided so as to be rotatable with a long side located at the upper end in front view as the rotation axis.

The operation unit facing panel 64 is located on the rear surface side of the display/operation panel 12. The display/operation panel 12 is rotatable in a stepless manner from a state in which the rear surface is in contact with a front surface of the operation unit facing panel 64 and the flat surface portion 61 is disposed parallel to the front surface of the printing apparatus 1 to a state in which the flat surface is disposed substantially perpendicular to the front surface of the printing apparatus 1. That is, the display/operation panel 12 can be disposed such that the flat surface portion 61 forms an angle of 0 degrees to substantially 90 degrees with respect to the front surface of the printing apparatus 1.

Accordingly, in the printing apparatus 1, for example, even when the user operates the printing apparatus 1 at a position facing the left side surface, the flat surface portion 61 is disposed so as to form substantially 90 degrees with respect to the front surface of the printing apparatus 1, and thus it is possible to operate or visually recognize the display/operation panel 12.

In addition, in the printing apparatus 1, since the flat surface portion 61 is disposed so as to form substantially 0 degrees with respect to the front surface of the printing apparatus 1, it is possible to easily visually recognize the operation panel even in a state where an operator is seated.

In addition, when the flat surface portion 61 forms substantially 0 degrees with respect to the front surface of the printing apparatus 1, it is possible to reduce a space required for disposing the printing apparatus 1. Accordingly, for example, when the printing apparatus 1 is packaged and transported, the printing apparatus 1 is packaged in a state in which the flat surface portion 61 forms substantially 0 degrees with respect to the front surface of the printing apparatus 1, and thus it is possible to suppress an increase in packing materials of the printing apparatus 1. For this reason, the printing apparatus 1 can be transported at low cost, and transport efficiency can be improved.

In the following description, a state of the display/operation panel 12 in which the flat surface portion 61 forms substantially 0 degrees with respect to the front surface of the printing apparatus 1 is referred to as a 0 degree posture, and a state of the display/operation panel 12 in which the flat surface portion 61 forms substantially 90 degrees with respect to the front surface of the printing apparatus 1 is referred to as a 90 degree posture.

In addition, the display/operation panel 12 can be maintained in a state of forming a freely selected angle within the rotatable range.

Figure 11:
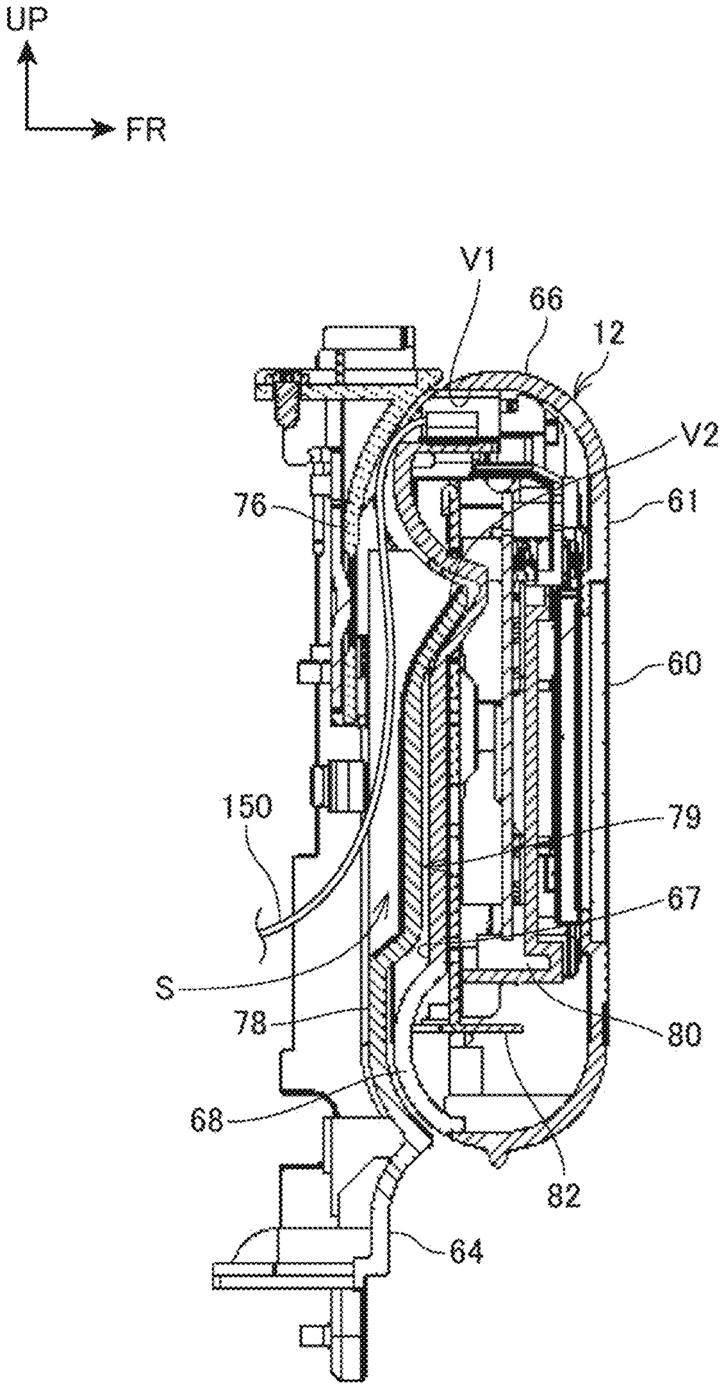
FIG. 11 is a cross-sectional view in a plane XI of FIG. 9.
Figure 12:
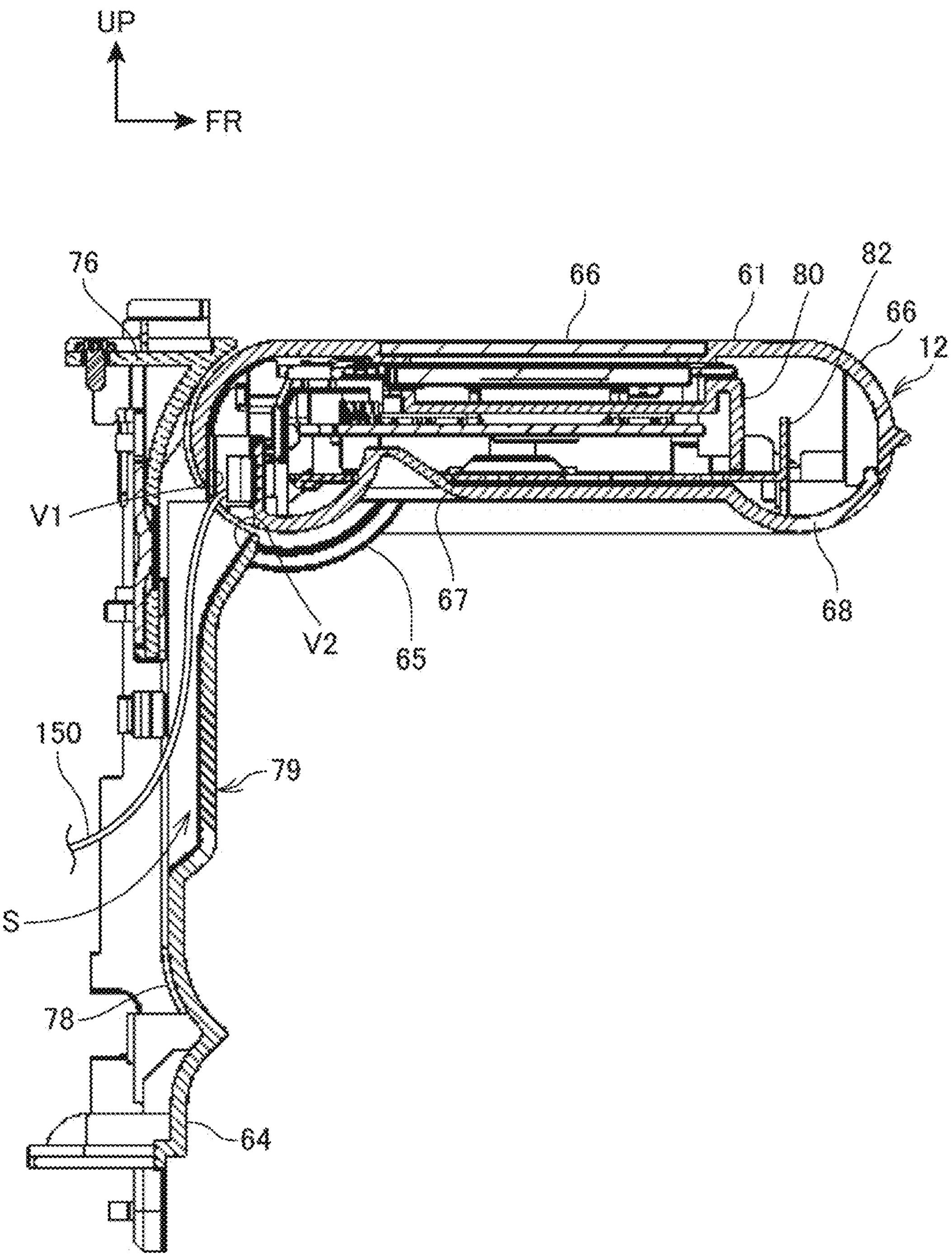
FIG. 12 is a cross-sectional view in a plane XII of FIG. 10.

FIG. 11 is a cross-sectional view in the plane XI of FIG. 9. FIG. 12 is a cross-sectional view in the plane XII of FIG. 10.

As illustrated in FIGS. 11 and 12, the display/operation panel 12 includes a front surface portion panel 66 forming the flat surface portion 61, and a rear surface portion panel 68 forming the rear surface, and these panels are combined to form a housing of the display/operation panel 12. The rear surface portion panel 68 is provided with a rear surface concave portion 67 that has a shape recessed toward the front surface portion panel 66.

The front surface portion panel 66 and the rear surface portion panel 68 are disposed with a gap V1 therebetween at a portion corresponding to the long side serving as the rotation axis of the display/operation panel 12.

Here, as illustrated in FIGS. 11 and 12, the operation unit facing panel 64 is formed by an upper portion facing panel 76 and a lower portion facing panel 78 located below the upper portion facing panel 76. A gap V2 is provided between a lower end portion of the upper portion facing panel 76 and an upper end portion of the lower portion facing panel 78.

Figure 13:
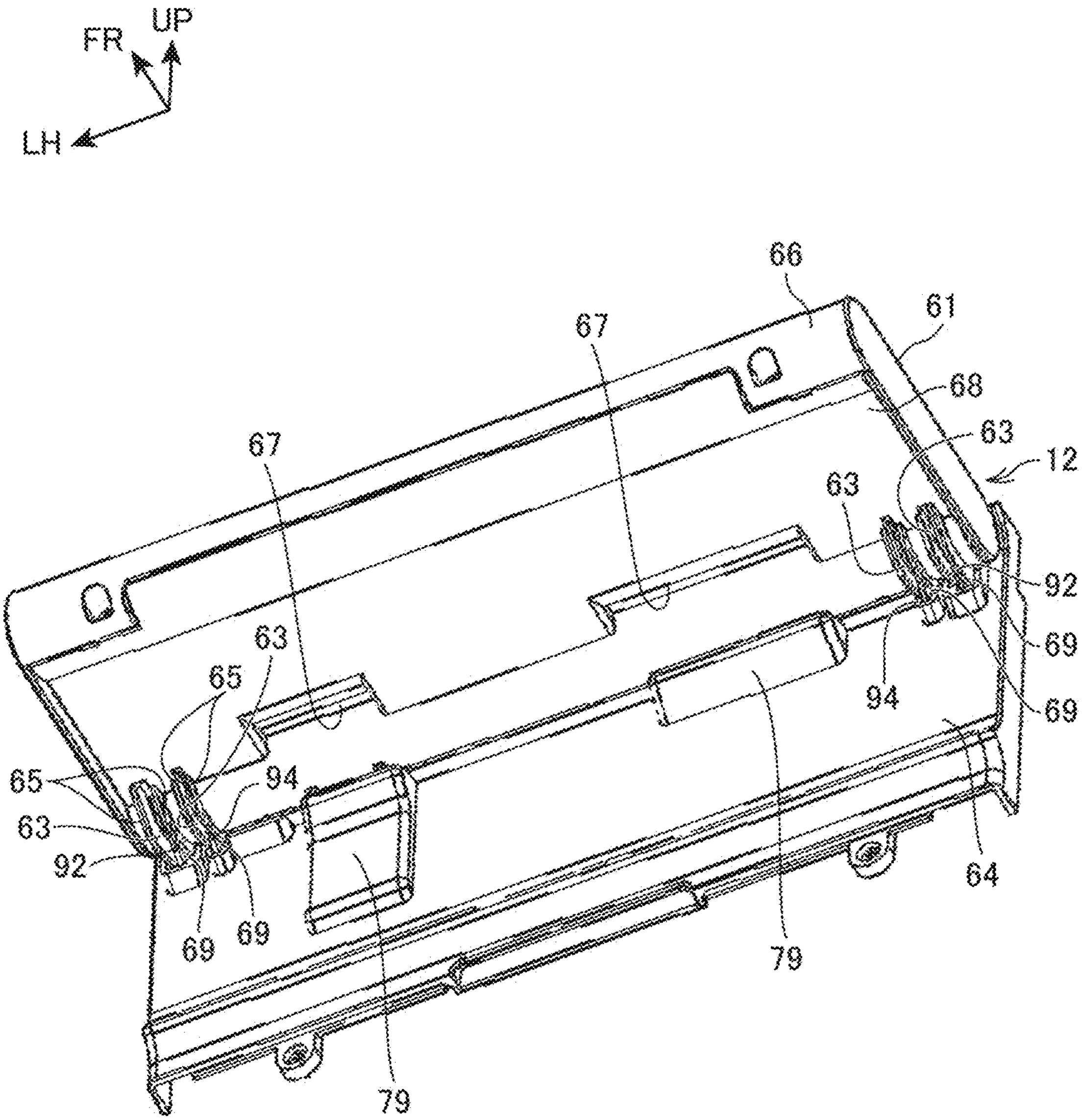
FIG. 13 is a perspective view illustrating the display/operation panel and an operation unit facing panel.

FIG. 13 is a perspective view illustrating the display/operation panel 12 and the operation unit facing panel 64.

As illustrated in FIG. 13, the lower portion facing panel 78 is provided with a bulging portion 79 that bulges from the inside toward the outside of the apparatus case 10. As illustrated in FIGS. 11 and 12, a bulging space S is provided inside the bulging portion 79. A wiring line 150 extending from the printing unit 22, the transport unit 24, the control board 18, and the like is housed in the bulging space S.

The bulging portion 79 has a shape such that an entirety thereof fits inside the rear surface concave portion 67. Therefore, in the printing apparatus 1, it is possible to provide the bulging portion 79 while preventing the display/operation panel 12 from protruding outward from the apparatus case 10.

As illustrated in FIGS. 11 and 12, the wiring line 150 extending from an inside of the bulging space S is inserted into the gap V1 and the gap V2. Within the range in which the display/operation panel 12 is rotatable, the wiring line 150 is constantly disposed inside the gap V1 and the gap V2.

For this reason, in the printing apparatus 1, while the display/operation panel 12 has a function of rotating, it is possible to wire the respective units disposed inside the apparatus case 10 and a mechanism inside the display/operation panel 12.

In the printing apparatus 1, since the wiring line 150 is not exposed to the outside of the printing apparatus 1 and is housed in the gap V1 and the gap V2, electrostatic noise outside the printing apparatus 1 is prevented from being discharged to an electronic circuit unit inside the printing apparatus 1. For this reason, in the printing apparatus 1, occurrence of a failure in various electric components included in the printing apparatus 1 due to the noise is suppressed.

In addition, in the printing apparatus 1, it is possible to hide the gap V1 and the gap V2 while preventing breaking of the wiring line 150 due to an erroneous operation or the like and securing the function. For this reason, as for the printing apparatus 1, an appearance and a design property can be ensured, and a degree of freedom in design can be improved.

As illustrated in FIG. 13, the rear surface portion panel 68 is provided with an operation unit slit 63 formed by cutting out downward from a long side located at an upper portion when the display/operation panel 12 is in the 0 degree posture. The two operation unit slits 63 are provided at each of both end portions in the left and right directions in the rear surface portion panel 68.

The rear surface portion panel 68 is provided with a flange portion 65. The flange portion 65 has a flange shape rising from the rear surface portion panel 68. The flange portions 65 are provided so as to sandwich the operation unit slit 63 from the left and right directions. The flange portion 65 has a fan-shaped flange shape centered on the rotation axis of the display/operation panel 12 when viewed from the left and right directions.

As described above, in the printing apparatus 1, by providing the flange portion 65, when the display/operation panel 12 is rotated, foreign matter or the like is kept away from a portion close to a rotational movement shaft. As a result, in the printing apparatus 1, foreign matter or the like is prevented from being sandwiched between the display/operation panel 12 and the apparatus case 10.

The operation unit facing panel 64 is provided with a plurality of panel slits 69. When the display/operation panel 12 is in the 0 degree posture, the panel slits 69 are provided at positions overlapping with the operation unit slits 63, respectively, in front view. The panel slit 69 is formed by cutting out downward from a long side located at an upper portion.

Figure 14:
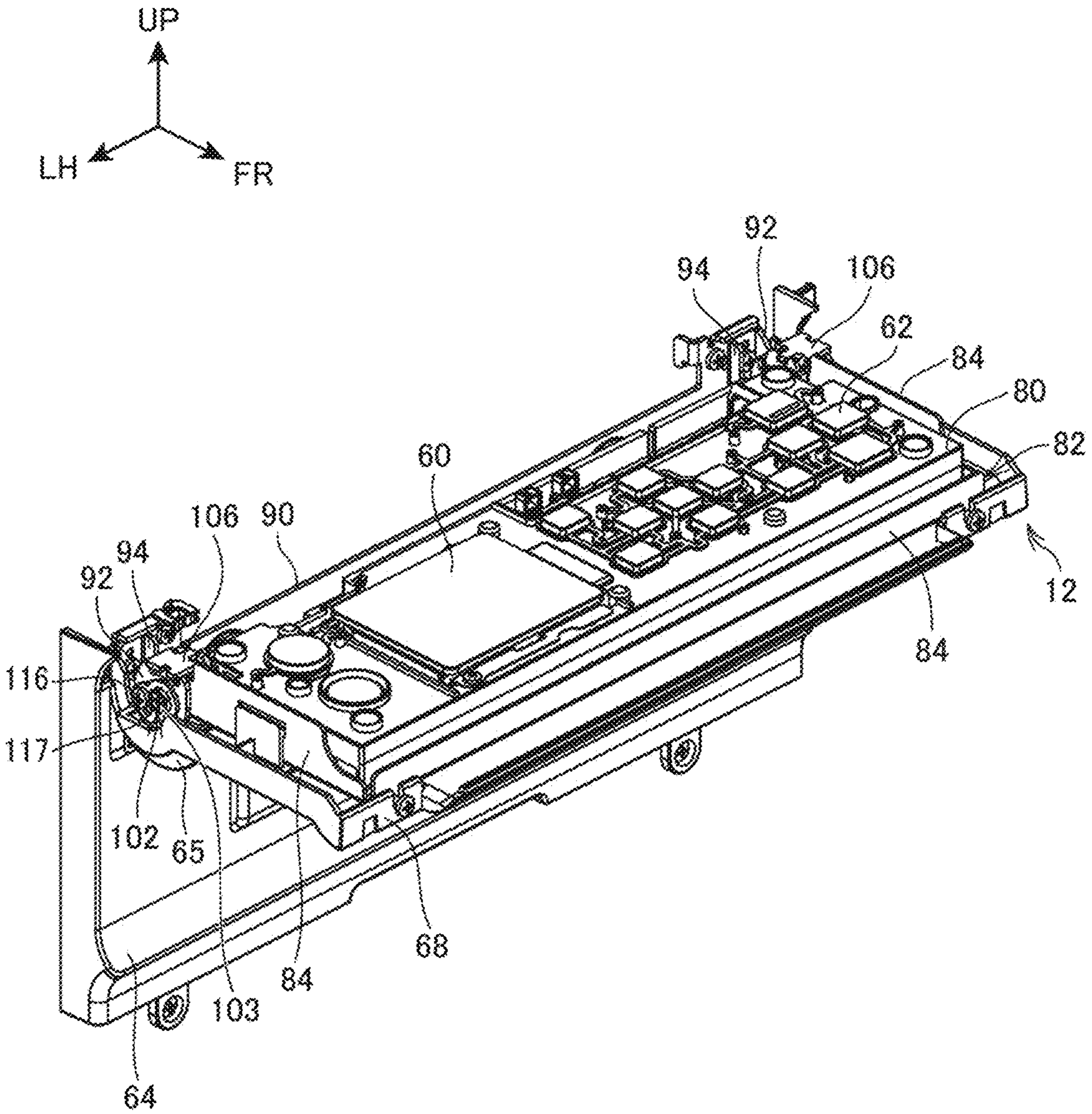
FIG. 14 is a perspective view of the display/operation panel.

FIG. 14 is a perspective view of the display/operation panel 12. FIG. 14 is illustrated with the front surface portion panel 66 omitted.

As illustrated in FIG. 14, an operation board 80 is housed inside the display/operation panel 12. The display 60 and the operator 62 are mounted at the operation board 80. The wiring line 150 is coupled to the operation board 80. Similarly to the control board 18, the operation board 80 includes a CPU, a ROM, a RAM, and the like, as a calculation execution unit. The ROM of the operation board 80 stores firmware executable by the CPU, data related to the firmware, and the like in a non-volatile manner. In addition, the RAM temporarily stores the data related to the firmware executed by the CPU. The operation board 80 may include other peripheral circuits and the like. The operation board 80 may include a storage unit capable of storing various programs and data such as control programs and data related to these control programs in a nonvolatile manner.

The operation board 80 is formed to operate the light-emitting unit 72 and the light-receiving unit 74 and to be capable of acquiring a detection value of the label detector 70. The label detector 70 functions as a detection unit in cooperation with the operation board 80.

A board holding portion 82 for holding the operation board 80 is housed inside the display/operation panel 12. The board holding portion 82 is formed in a substantially box shape in which a flat surface facing the flat surface portion 61 is omitted. The operation board 80 is fixed to the board holding portion 82 by, for example, a screw member or the like in a state of being housed inside the board holding portion 82.

Figure 15:
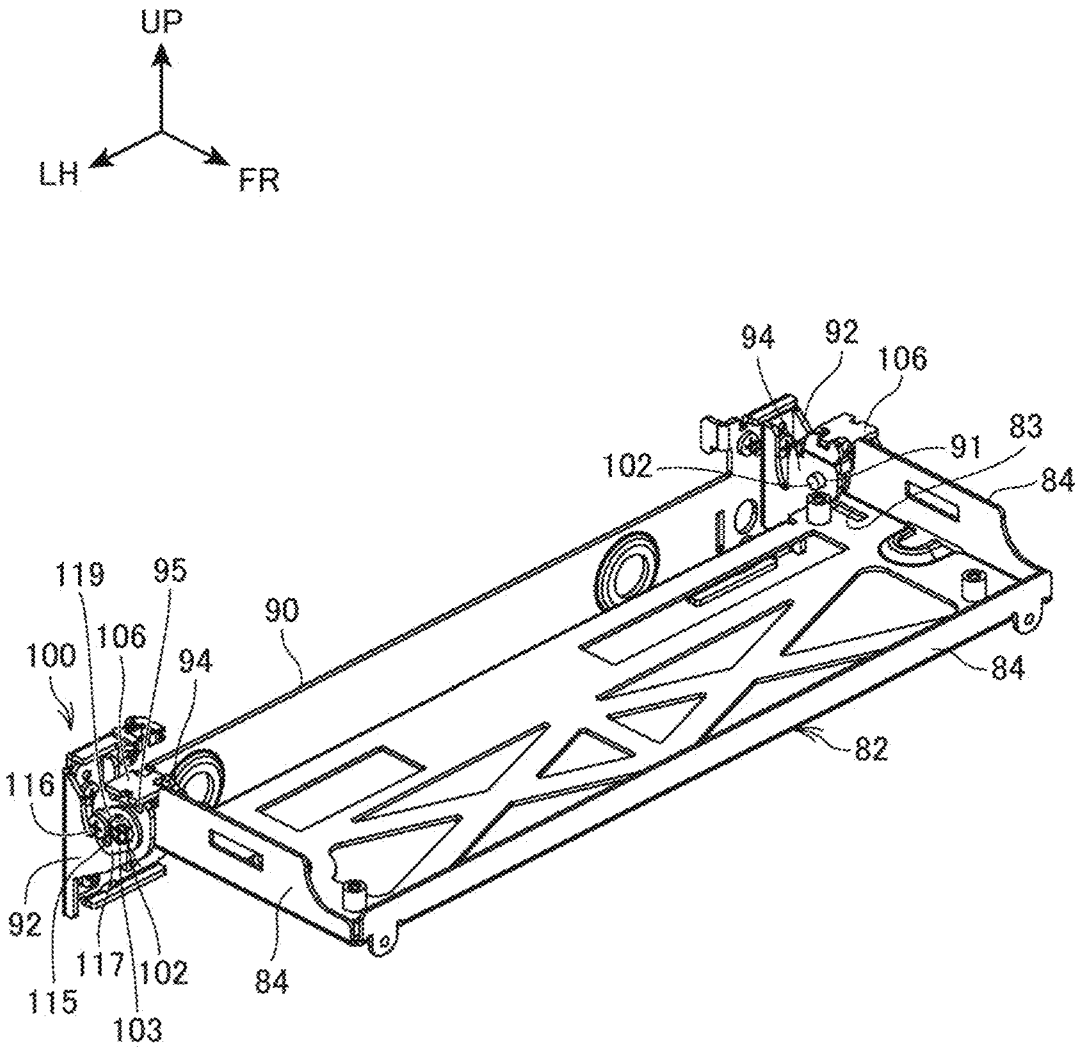
FIG. 15 is a perspective view of a board holding portion and an attachment portion.
Figure 16:
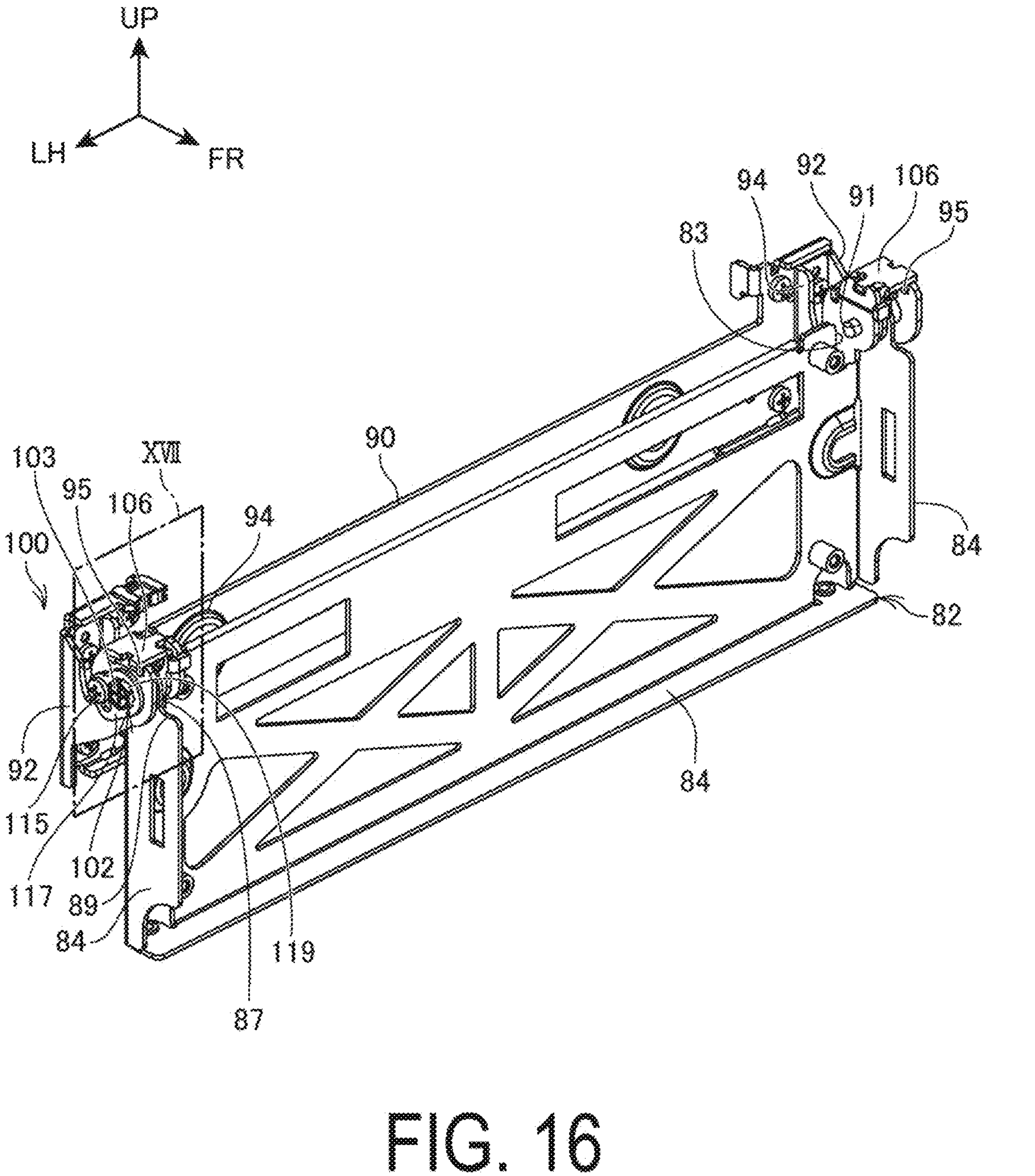
FIG. 16 is a perspective view of the board holding portion and the attachment portion.

FIGS. 15 and 16 are perspective views of the board holding portion 82 and an attachment portion 90.

The board holding portion 82 is provided with plate-like standing portions 84 surrounding the operation board 80 in a circumferential direction. The standing portions 84 face respective sides of the operation board 80 and form flat surfaces standing in a plate thickness direction of the operation board 80.

As illustrated in FIGS. 15 and 16, the board holding portion 82 is provided with a slit 83 formed by cutting out downward from a long side located at an upper portion when the display/operation panel 12 is in the 0 degree posture. The slits 83 are provided inside the standing portions 84 located in the left and right directions of the operation board 80 in front view in the left and right directions.

As illustrated in FIGS. 14, 15, and 16, the display/operation panel 12 is attached to the frame 4 via the attachment portion 90.

The attachment portion 90 is a member attached to the frame 4 at a portion located on the front surface side of the printing apparatus 1. The attachment portion 90 is formed in an elongated shape extending in the left and right directions. First arm portions 92 are provided at both ends in a longitudinal direction of the attachment portion 90. The first arm portion 92 has a flat plate shape extending from the inside toward the outside of the apparatus case 10. The first arm portions 92 are disposed outside the standing portions 84 in the left and right directions of the operation board 80 in front view, in the left and right directions. The first arm portions 92 are provided such that flat surfaces included in the first arm portion 92 face the flat surfaces of the standing portions 84 located in the left and right directions of the operation board 80.

Second arm portions 94 are provided at both end portions in the longitudinal direction of the attachment portion 90. Similarly to the first arm portion 92, the second arm portion 94 has a flat plate shape extending from the inside toward the outside of the apparatus case 10. The second arm portions 94 are disposed outside the standing portions 84 in the left and right directions of the operation board 80 in front view, in the left and right directions. The first arm portions 92 are provided such that flat surfaces included in the first arm portion 92 face the flat surfaces of the standing portions 84 located in the left and right directions of the operation board 80.

The first arm portion 92 and the second arm portion 94 extend from the inside to the outside of the apparatus case 10 by being passed through the panel slit 69, and are disposed inside the display/operation panel 12 by being inserted into the operation unit slit 63.

The display/operation panel 12 is rotatably attached to the printing apparatus 1 by a hinge portion 105. The hinge portion 105 is formed by coupling the board holding portion 82 and the attachment portion 90. The hinge portions 105 are provided at both end portions of the display/operation panel 12.

In the following description, the hinge portion 105 located at a left end portion of the display/operation panel 12 will be described. The hinge portion 105 located at a right end portion of the display/operation panel 12 has substantially the same structure that is symmetrical to the hinge portion 105 located at the left end portion. Note that the hinge portion 105 may be provided at only one of both the end portions of the display/operation panel 12.

Figure 17:
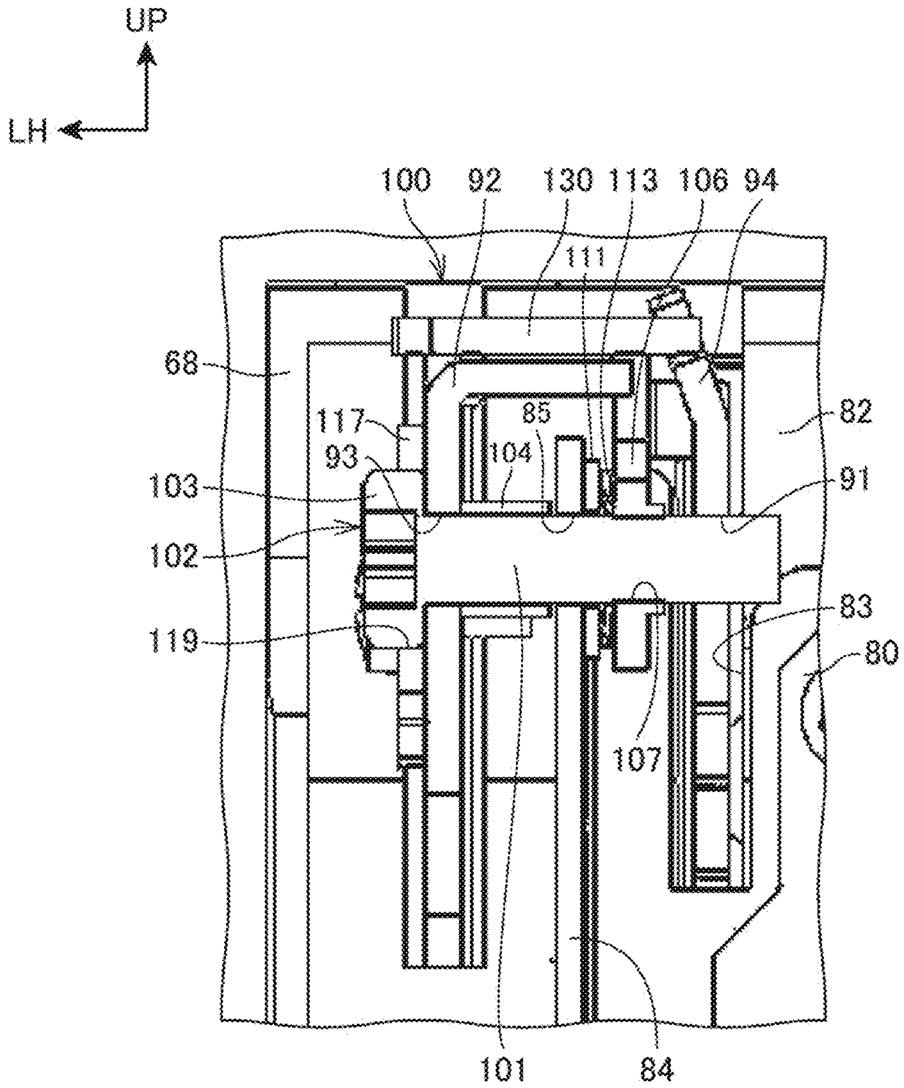
FIG. 17 is a cross-sectional view in a plane XVII of FIG. 16.

FIG. 17 is a cross-sectional view in a plane XVII of FIG. 16. The plane XVII is a plane that is orthogonal to the front and rear directions, and over an entire length of a rod-shaped portion 101 in a longitudinal direction of a hexagonal bolt 102, passes through a central axis of the rod-shaped portion 101.

As illustrated in FIG. 17, in each of the standing portions 84 located in the left and right directions of the operation board 80, a first insertion hole 85 penetrating in the left and right directions is provided at a position close to a long side located at an upper end when the display/operation panel 12 is in the 0 degree posture.

A second insertion hole 93 penetrating in the left and right directions is provided at a tip portion of the first arm portion 92.

Similarly, a third insertion hole 91 penetrating in the left and right directions is provided at a tip portion of the second arm portion 94. An upper end portion of the second arm portion 94 is bent toward the first arm portion 92. Thus, in the display/operation panel 12, the hinge portion 105 can be formed to be small.

The hexagonal bolt 102 is inserted into the first insertion hole 85, the second insertion hole 93, and the third insertion hole 91. The hexagonal bolt 102 includes the rod-shaped portion 101 provided with a screw groove, and a head portion 103 corresponding to a screw head. In the present embodiment, the head portion 103 has a hexagonal shape in plan view of head portion 103.

In the first arm portion 92, the head portion 103 is disposed outside a flat surface located on an opposite side of the board holding portion 82.

The standing portion 84 included in the board holding portion 82 and the first arm portion 92 provided at the attachment portion 90 are coupled to each other and pivotally supported to each other by the hexagonal bolt 102.

A spacer 104 is passed through the hexagonal bolt 102. The spacer 104 is a cylindrical member which has a predetermined length dimension and into which the hexagonal bolt 102 can be inserted. The spacer 104 is disposed between the first arm portion 92 and the standing portion 84. As a result, the first arm portion 92 and the standing portion 84 are disposed at a predetermined interval along the left and right directions.

A fitting member 106 is passed through the hexagonal bolt 102. The fitting member 106 is a member formed in a plate shape. The fitting member 106 is provided with a screw hole 107 penetrating in a plate thickness direction of the fitting member 106. The screw hole 107 is provided with a screw groove. By the hexagonal bolt 102 passed through and fitted into the screw hole 107, the fitting member 106 is screwed to the hexagonal bolt 102. As a result, the board holding portion 82 and the attachment portion 90 are fastened to each other.

The fitting member 106 is disposed between the standing portion 84 and the second arm portion 94.

A flat washer 111 and a disc spring 113 are passed through the hexagonal bolt 102. The flat washer 111 and the disc spring 113 are disposed between the standing portion 84 and the fitting member 106.

When the hexagonal bolt 102 is tightened in the hinge portion 105, the fitting member 106 moves closer to the head portion 103 in the left and right directions. In this case, the flat washer 111 and the disc spring 113 are sandwiched between the standing portion 84 and the fitting member 106. Then, the flat washer 111 and the disc spring 113 are pressed against the standing portion 84 and the fitting member 106 by biasing force and restoring force of the disc spring 113.

As a result, sliding friction is generated at contact portions between the flat washer 111, and the disc spring 113, the standing portion 84, and the fitting member 106. Therefore, the display/operation panel 12 can maintain a state of forming a freely selected angle with respect to the apparatus case 10 within the rotatable range by the sliding friction.

As described above, in the display/operation panel 12 of the present embodiment, an operation load of the hinge portion 105 can be adjusted by screw tightening torque of the hexagonal bolt 102. Therefore, in the display/operation panel 12, high torque can be generated in the hinge portion 105.

Further, in the display/operation panel 12, the hexagonal bolt 102 can be easily disassembled and replaced even when worn.

Further, each of the flat washer 111, the disc spring 113, the standing portion 84, and the fitting member 106 can be formed of metal. When these members are formed of metal, it is possible to suppress occurrence of creep or the like which leads to a decrease in sliding friction, in the hinge portion 105.

Note that the flat washer 111 may be omitted. Further, for example, for the hinge portion 105, any member, not limited to the disc spring 113, such as a coil spring may be used as long as the member is a biasing member capable of biasing along a longitudinal direction of the hexagonal bolt 102. In addition, for example, for the hinge portion 105, not limited to the biasing member, another member such as a spacer that generates sliding friction by being pressed against the standing portion 84 and the fitting member 106 may be used.

The flat washer 111 and the disc spring 113 correspond to a "pressure contact portion".

As illustrated in FIGS. 15 and 16, in the first arm portion 92, a rotation suppressing portion 117 is provided outside a flat surface located on an opposite side of the board holding portion 82. The rotation suppressing portion 117 is a member formed in a plate shape. The rotation suppressing portion 117 is provided with a long hole 115 penetrating in a plate thickness direction of the rotation suppressing portion 117. The rotation suppressing portion 117 is fixed to the first arm portion 92 by a screw 116 inserted into the long hole 115.

As illustrated in FIGS. 15, 16, and 17, the rotation suppressing portion 117 is provided with a fitting hole 119 penetrating in the plate thickness direction of the rotation suppressing portion 117. The fitting hole 119 is formed in a polygonal star shape in plan view of the rotation suppressing portion 117. In the present embodiment, the fitting hole 119 is formed in a dodecagon shape.

The head portion 103 is inserted into the fitting hole 119. Accordingly, in the printing apparatus 1, loosening of the hexagonal bolt 102 is suppressed.

Further, the fitting hole 119 includes more corner portions than the head portion 103. In addition, the rotation suppressing portion 117 is fixed to the first arm portion 92 via the long hole 115. For this reason, in the printing apparatus 1, the rotation suppressing portion 117 can be disposed at a position where the head portion 103 can be inserted into the fitting hole 119 according to the disposition of the head portion 103.

In this way, by providing the rotation suppressing portion 117, in the display/operation panel 12, loosening of the hexagonal bolt 102 is suppressed. For this reason, in the printing apparatus 1, it is possible to suppress a decrease in an operation load of the display/operation panel 12 caused by the loosening of the hexagonal bolt 102.

As described above, in the present embodiment, the rotation suppressing portion 117 is provided with the fitting hole 119 having a dodecagon shape for the hexagonal bolt 102. As a result, the rotation suppressing portion 117 can be positioned with respect to the hexagonal bolt 102 in increments of 30 degrees. Therefore, in the printing apparatus 1, it is possible to shorten a length dimension of the arc-shaped long hole 115, and it is possible to form the hinge portion 105 to be small.

In the printing apparatus of the present embodiment, the hexagonal bolt 102 is used, and the fitting hole 119 is formed in a dodecagon shape which is an example of a polygonal star shape, but, the present disclosure is not limited thereto, and a combination of other shapes may be used.

Here, a reinforcing structure of the hinge portion 105 will be described.

Figure 18:
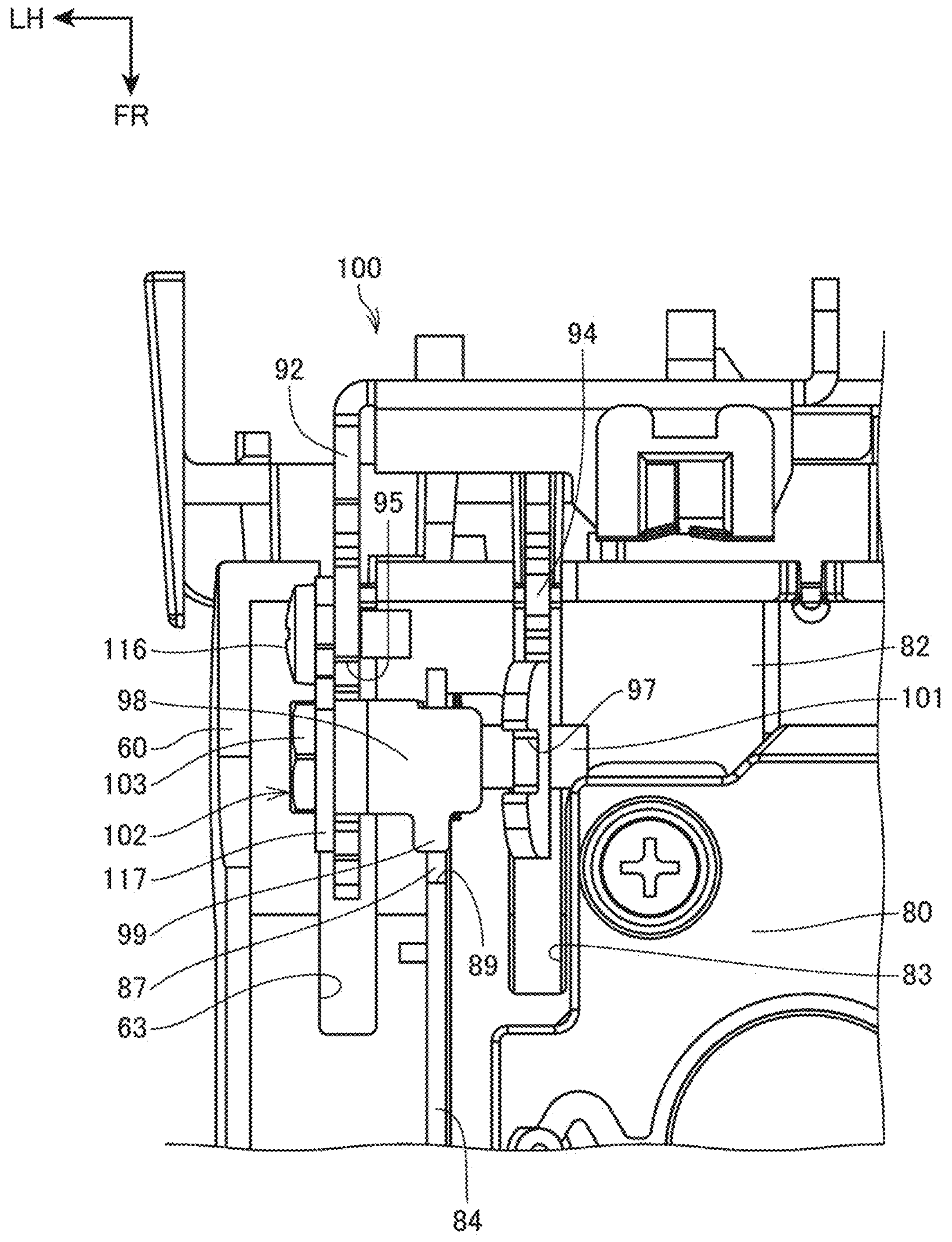
FIG. 18 is a plan view of a hinge portion.

As illustrated in FIG. 18, in each of the standing portions 84 located in the left and right directions, a cutout portion 87 is provided at an end portion overlapping the first insertion hole 85 in plan view of the display/operation panel 12. By providing the cutout portion 87, the standing portion 84 is provided with an edge portion 89 of the cutout portion 87. The edge portion 89 extends in the plate thickness direction of the operation board 80.

FIG. 18 is a plan view of the hinge portion 105 when the display/operation panel 12 is in the 0 degree posture. FIG. 18 is illustrated with the fitting member 106 omitted.

As illustrated in FIG. 16, in the first arm portion 92, at a position overlapping the second insertion hole 93 in plan view, an engagement concave portion 95 formed by cutting out downward is provided.

As illustrated in FIG. 18, an extending portion 98 extending toward the cutout portion 87 is provided at the tip portion of the first arm portion 92. The extending portions 98 are provided with protruding portions 99 at positions respectively overlapping the standing portions 84 located in the left and right directions in plan view. The protruding portion 99 protrudes forward from the extending portion 98 by a predetermined length dimension.

In the second arm portion 94, a plurality of engagement concave portions 97 formed by cutting out downward are provided at positions overlapping the third insertion hole 91 in plan view.

Figure 19:
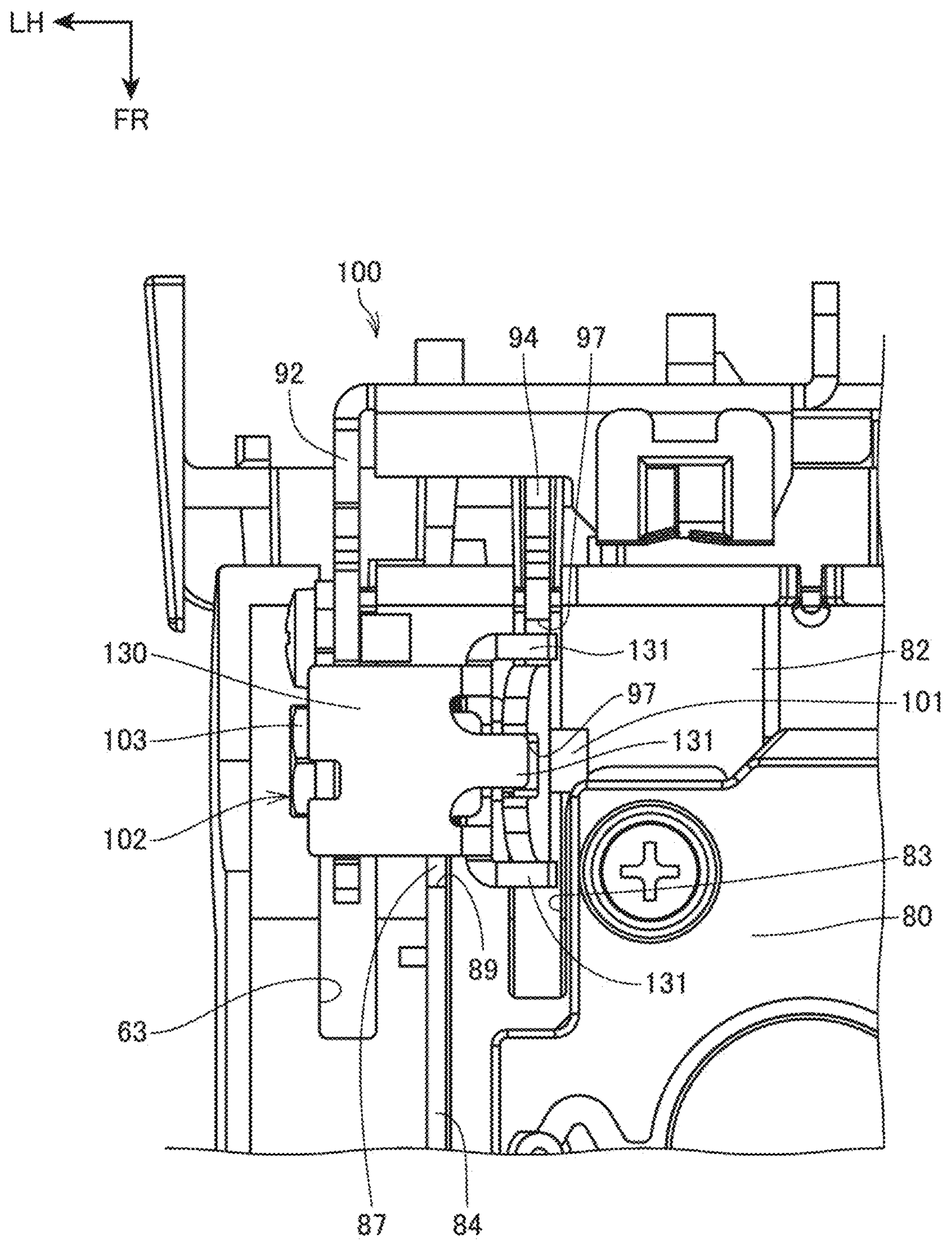
FIG. 19 is a plan view of the hinge portion.

FIG. 19 is a plan view of the hinge portion 105 when the display/operation panel 12 is in the 0 degree posture. In FIG. 19, the fitting member 106 is not omitted but illustrated.

The fitting member 106 is provided with an engagement piece portion 130. As illustrated in FIG. 17, the engagement piece portion 130 is formed integrally with the fitting member 106. As illustrated in FIG. 19, the engagement piece portions 130 are disposed at position respectively overlapping the standing portions 84 located in the left and right directions in plan view, and are each disposed at substantially the same position as an upper end portion of the first arm portion 92 and the upper end portion of the second arm portion 94. The engagement piece portion 130 includes a plurality of engagement pieces 131. The respective engagement pieces 131 engage with the engagement concave portion 95, the engagement concave portion 97, and a front end of the second arm portion 94.

When a load is applied to the display/operation panel 12 so that the flat surface portion 61 forms an angle of 90 degrees or more with respect to the front surface of the printing apparatus 1, the edge portion 89 comes into contact with the engagement piece portion 130 and the protruding portion 99. As described above, the engagement piece portion 130 engages with the first arm portion 92 and the second arm portion 94. Accordingly, the above-described load is dispersed and transmitted to the attachment portion 90 via the edge portion 89 and the engagement piece portion 130. Therefore, even when a force for rotating the display/operation panel 12 outside the rotational range is applied to the display/operation panel 12, the hinge portion 105 is prevented from being damaged.

The engagement piece portion 130 corresponds to a "contact portion".

The above-described embodiment is merely a specific example to which the present disclosure is applied. The present disclosure is not limited to the configuration of the above-described embodiment, and can be implemented in various aspects without departing from the gist of the disclosure.

Figure 20:
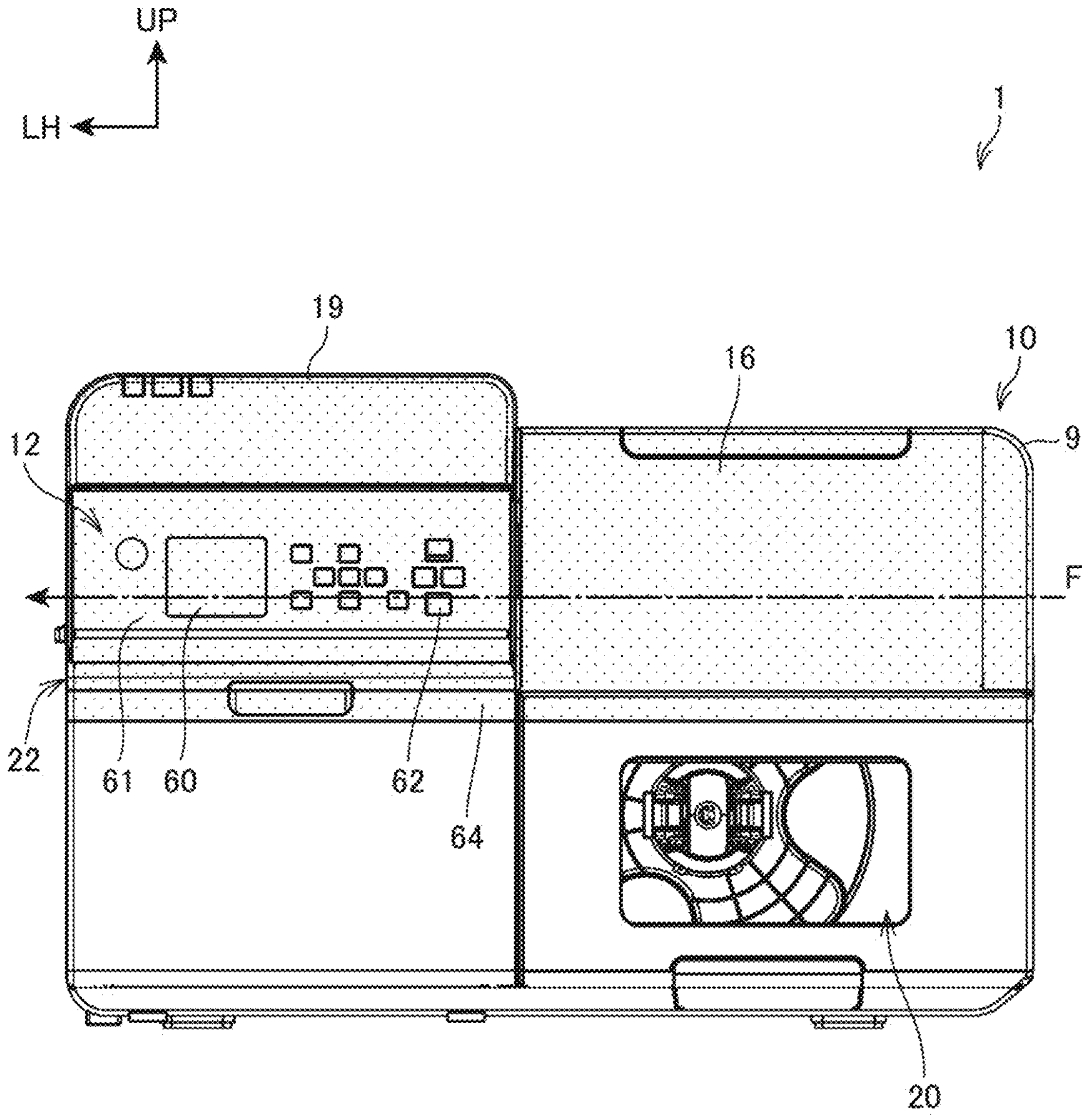
FIG. 20 is a front view of the printing apparatus according to a modification.
Figure 21:
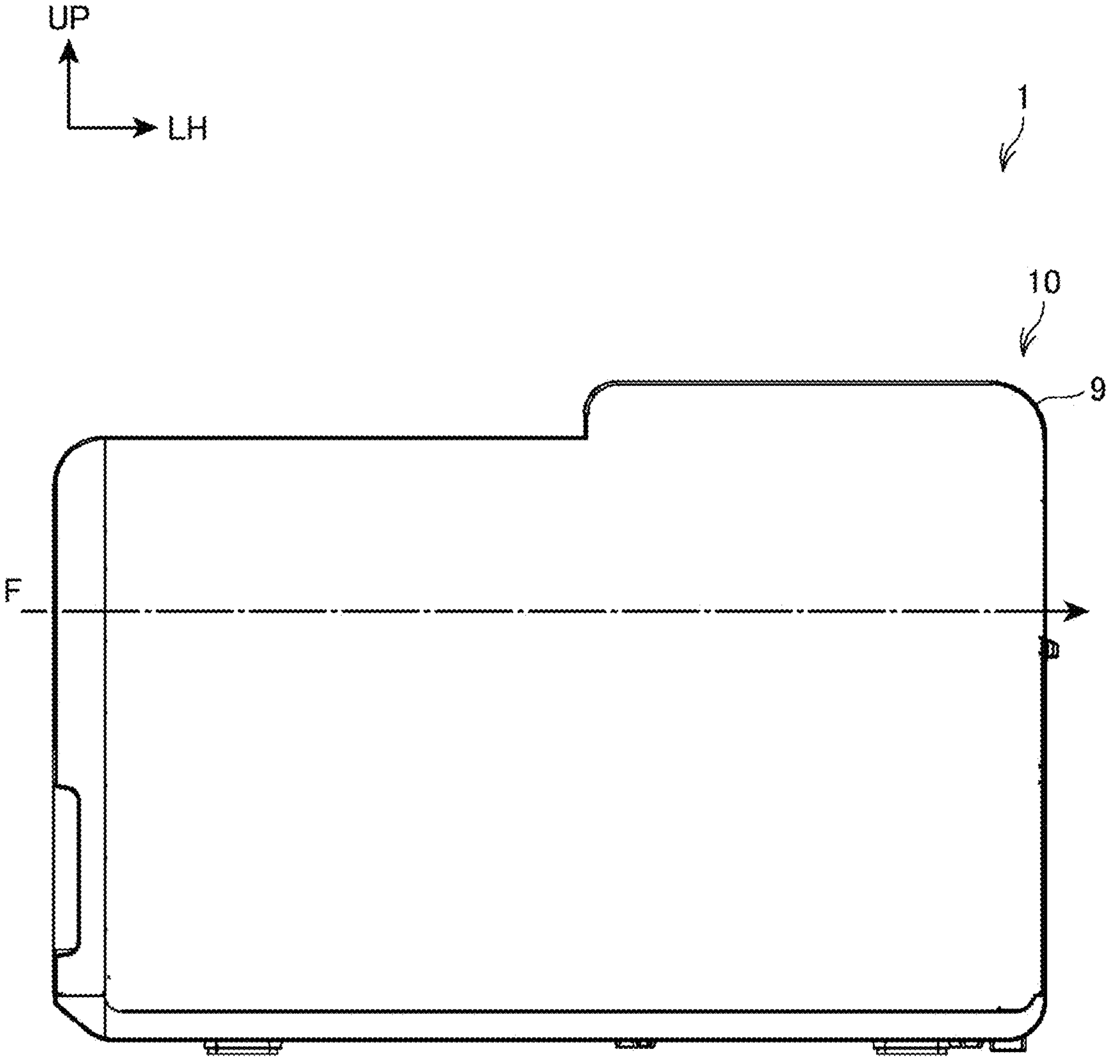
FIG. 21 is a rear view of the printing apparatus according to the modification.
Figure 22:
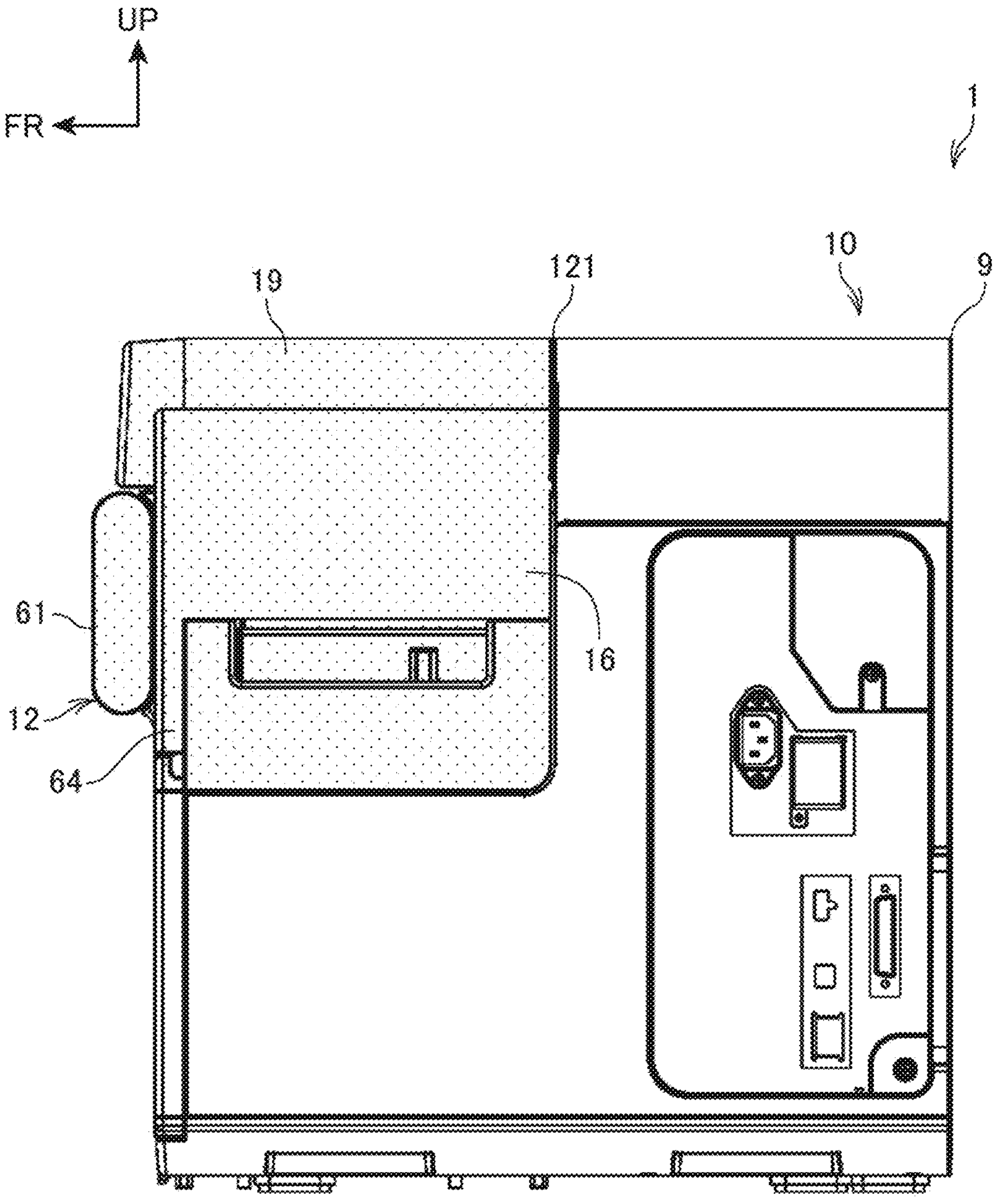
FIG. 22 is a right side view of the printing apparatus according to the modification.

FIG. 20 is a front view of the printing apparatus 1 according to a modification. FIG. 21 is a rear view of the printing apparatus 1 according to the modification. FIG. 22 is a right side view of the printing apparatus 1 according to the modification. Since a left side view, a plan view, and a bottom view of the printing apparatus 1 are the same as FIGS. 4, 6, and 7, and thus are omitted.

As illustrated in FIGS. 20 to 22, in the printing apparatus 1, the step shape provided at the top surface of the apparatus case 10 may be formed to be smaller.

In the embodiment described above, the printing apparatus 1 is provided with the fitting member 106. However, the present disclosure is not limited thereto, and a nut may be provided at the printing apparatus 1 instead of the fitting member 106. In this case, the nut may be disposed at a position closer to the operation board 80 than the second arm portion 94.

Furthermore, for example, the third insertion hole 91 may be a screw hole. In this case, the fitting member 106 may be omitted.

Further, for example, the second arm portion 94 may be omitted.

In the above-described embodiment, the attachment portion 90 is provided at the frame 4. However, the present disclosure is not limited thereto, and the attachment portion 90 may be provided at the exterior panel 9.

Further, for example, the second arm portion 94 may be omitted.

In addition, for example, at the left side surface of the printing apparatus 1, other devices such as a peeler that performs a process of peeling the label from the mount and the cutter unit 110 may be provided.

In the embodiment described above, the label printer has been exemplified as the printing apparatus 1. However, the printing apparatus 1 is not limited to the label printer. It is sufficient that the printing apparatus 1 is a device that includes a transport device that transports a printing medium, and the printing unit 22 that performs printing on the printing medium. For example, the printing apparatus 1 may be a large format printer, a textile printing machine that performs textile printing, or the like.

In the embodiment described above, the line head type has been exemplified for the printing head 42, but the printing head 42 is not limited thereto, and may be of a serial head type. Further, a printing method for the printing head 42 is not limited to the ink jet-type.

The directions such as the horizontal direction and the vertical direction and the various shapes in the above-described embodiment include a so-called equivalent range that achieves the same operation and effect as those directions and shapes unless otherwise specified.

OVERVIEW OF PRESENT DISCLOSURE

An overview of the present disclosure is added below.

Supplementary Note 1

A printing apparatus including a printing unit configured to discharge ink onto a printing medium to form an image, a transport unit configured to transport the printing medium, a frame to which the printing unit and the transport unit are attached, an exterior portion configured to cover the frame, an operation unit disposed outside the exterior portion, and an attachment portion to which the operation unit is rotatably attached, wherein the operation unit includes an operation board, and a board holding portion for holding the operation board, the board holding portion is provided with a standing portion disposed outside the operation board and including a flat surface intersecting a flat surface of the operation board, the standing portion is provided with a first insertion hole penetrating in a direction intersecting the flat surface included in the standing portion, the attachment portion includes a first arm portion extending outward the exterior portion, and disposed on an opposite side of the operation board with the standing portion interposed therebetween, the first arm portion is provided with a second insertion hole penetrating in a direction intersecting a longitudinal direction of the first arm portion, a screw member is inserted into the first insertion hole and the second insertion hole, and a fitting member disposed between the standing portion and the operation board, and fitting into the screw member is attached to the screw member.

Accordingly, in the printing apparatus, it is possible to rotatably provide the operation unit in a space-saving manner.

Supplementary Note 2

The printing apparatus according to Supplementary Note 1, wherein to the screw member, a pressure contact portion is attached into which the screw member is inserted, that is disposed between the fitting member and the standing portion, and is pressed against each of the fitting member and the standing portion.

Accordingly, in the printing apparatus, it is possible to maintain the operation unit in a state of forming a freely selected angle within a rotatable range by sliding friction.

Supplementary Note 3

The printing apparatus according to Supplementary Note 1 or 2, wherein the first arm portion is provided with a rotation suppressing portion provided with a fitting hole into which a head portion of the screw member is fitted.

Accordingly, in the printing apparatus, loosening of the screw member is suppressed.

Supplementary Note 4

The printing apparatus according to Supplementary Note 3, wherein the head portion has a polygonal shape, and the fitting hole has a star-shaped polygonal shape.

Accordingly, in the printing apparatus, it is possible to dispose the rotation suppressing portion at a position where the head portion can be inserted into the fitting hole in accordance with disposition of the head portion.

Supplementary Note 5

The printing apparatus according to any one of Supplementary Notes 1 to 4, wherein the attachment portion includes a second arm portion extending outward the exterior portion, and disposed on an opposite side of the first arm portion with the standing portion interposed therebetween, and the second arm portion is provided with a third insertion hole that penetrates in a direction intersecting a longitudinal direction of the first arm portion, and into which the screw member is inserted.

Accordingly, in the printing apparatus, the screw member can be reinforced.

Supplementary Note 6

The printing apparatus according to any one of Supplementary Notes 1 to 5, wherein the fitting member is provided with a contact portion with which the standing portion comes into contact when the operation unit is rotated most within a rotatable range, and the contact portion engages with the first arm portion.

Accordingly, in the printing apparatus, even when a force for rotating the operation unit outside the rotational range is applied to the operation unit, breakage is suppressed.

Supplementary Note 7

The printing apparatus according to any one of Supplementary Notes 1 to 6, wherein the exterior portion is provided with a flange portion that covers the first arm portion.

Accordingly, in the printing apparatus, foreign matter or the like is prevented from being sandwiched between the display unit and the exterior portion.

Supplementary Note 8

The printing apparatus according to any one of Supplementary Notes 1 to 7, wherein when the operation unit is disposed along a front surface of the exterior portion, an end portion of the operation unit located at an upper end is provided with a curved surface protruding upward.

Accordingly, in the printing apparatus, deposit is prevented from staying on the operation unit.

Supplementary Note 9

The printing apparatus according to any one of Supplementary Notes 1 to 8, wherein the exterior portion is provided with a concave portion, and at least a part of the operation unit is housed in the concave portion.

Accordingly, in the printing apparatus, a portion where the operation unit protrudes is reduced.

What is claimed is:

1. A printing apparatus, comprising:

a printing unit configured to discharge ink onto a printing medium to form an image;

a transport unit configured to transport the printing medium;

a frame to which the printing unit and the transport unit are attached;

an exterior portion configured to cover the frame;

an operation unit disposed outside the exterior portion; and an attachment portion to which the operation unit is rotatably attached, wherein the operation unit includes an operation board, and a board holding portion for holding the operation board, the board holding portion is provided with a standing portion disposed outside the operation board and including a flat surface intersecting a flat surface of the operation board, the standing portion is provided with a first insertion hole penetrating in a direction intersecting the flat surface included in the standing portion, the attachment portion includes a first arm portion extending outward the exterior portion, and disposed on an opposite side of the operation board with the standing portion interposed therebetween, the first arm portion is provided with a second insertion hole penetrating in a direction intersecting a longitudinal direction of the first arm portion, a screw member is inserted into the first insertion hole and the second insertion hole, and a fitting member disposed between the standing portion and the operation board, and fitting into the screw member is attached to the screw member.

2. The printing apparatus according to claim 1, wherein to the screw member, a pressure contact portion is attached into which the screw member is inserted, that is disposed between the fitting member and the standing portion, and is pressed against each of the fitting member and the standing portion.

3. The printing apparatus according to claim 1, wherein the first arm portion is provided with a rotation suppressing portion provided with a fitting hole into which a head portion of the screw member is fitted.

4. The printing apparatus according to claim 3, wherein the head portion has a polygonal shape, and the fitting hole has a star-shaped polygonal shape.

5. The printing apparatus according to claim 1, wherein the attachment portion includes a second arm portion extending outward the exterior portion, and disposed on an opposite side of the first arm portion with the standing portion interposed therebetween, and the second arm portion is provided with a third insertion hole that penetrates in a direction intersecting a longitudinal direction of the first arm portion, and into which the screw member is inserted.

6. The printing apparatus according to claim 1, wherein the fitting member is provided with a contact portion with which the standing portion comes into contact when the operation unit is rotated most within a rotatable range, and the contact portion engages with the first arm portion.

7. The printing apparatus according to claim 1, wherein the exterior portion is provided with a flange portion that covers the first arm portion.

8. The printing apparatus according to claim 1, wherein when the operation unit is disposed along a front surface of the exterior portion, an end portion of the operation unit located at an upper end is provided with a curved surface protruding upward.

9. The printing apparatus according to claim 1, wherein the exterior portion is provided with a concave portion, and at least a part of the operation unit is housed in the concave portion.

* * * * *